(12) United States Patent
Tashiro

(10) Patent No.: US 8,854,504 B2
(45) Date of Patent: Oct. 7, 2014

(54) ZOOM LENS AND IMAGE PICKUP APPARATUS HAVING THE SAME

(71) Applicant: Canon Kabushiki Kaisha, Tokyo (JP)

(72) Inventor: Yoshihisa Tashiro, Nikko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/860,649

(22) Filed: Apr. 11, 2013

(65) Prior Publication Data

US 2013/0286257 A1    Oct. 31, 2013

(30) Foreign Application Priority Data

Apr. 25, 2012    (JP) ................................. 2012-099789

(51) Int. Cl.
| | |
|---|---|
| *H04N 5/262* | (2006.01) |
| *G02B 15/14* | (2006.01) |
| *G02B 9/60* | (2006.01) |
| *H04N 5/232* | (2006.01) |
| *G02B 15/177* | (2006.01) |
| *G02B 27/64* | (2006.01) |

(52) U.S. Cl.
CPC .............. *G02B 15/14* (2013.01); *G02B 27/646* (2013.01); *G02B 9/60* (2013.01); *H04N 5/23296* (2013.01); *G02B 15/177* (2013.01)
USPC ......................... 348/240.3; 359/746; 359/714

(58) Field of Classification Search
CPC .... H04N 5/23296; G02B 9/60; G02B 15/177; G02B 15/14
USPC ........... 348/335, 340, 240.1, 240.3; 359/676, 359/714, 745, 746, 753, 763, 770
See application file for complete search history.

(56) References Cited

U.S. PATENT DOCUMENTS

| | | | |
|---|---|---|---|
| 7,184,221 B2 | 2/2007 | Misaka | |
| 8,189,074 B2 | 5/2012 | Miyazaki et al. | |
| 2008/0231696 A1* | 9/2008 | Kodama et al. | 348/81 |
| 2013/0188265 A1* | 7/2013 | Ebbesmeier et al. | 359/715 |

FOREIGN PATENT DOCUMENTS

| | | |
|---|---|---|
| JP | 07-306362 A | 11/1995 |
| JP | 2009-199092 A | 9/2009 |
| JP | 2009-251112 A | 10/2009 |

* cited by examiner

*Primary Examiner* — Nelson D. Hernández Hernández
(74) *Attorney, Agent, or Firm* — Carter, DeLuca, Farrell & Schmidt, LLP

(57) ABSTRACT

A zoom lens includes first to fifth lens unit having negative, positive, positive, negative, and positive refractive powers, in an order from an object side to an image side, an interval of each lens unit is configured to be changed in zooming, the first lens unit, in order from the object side to the image side, consists of one or two negative lenses and one positive lens, the second lens unit consists of one lens component that moves to the image side in focusing on an object at an infinite distance to a short distance object, and an interval D23, combined focal lengths D23w, f23w, and f4Rw, and a length D2 are appropriately set.

12 Claims, 11 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus including the zoom lens, which are suitably used as an image pickup apparatus such as a digital camera, a video camera, a TV camera, a surveillance camera, or a silver-salt film camera.

2. Description of the Related Art

An image pickup optical system that is used for an image pickup apparatus is required to have a wide angle of view, high optical performance over an entire zoom range, and a total system of a small-size zoom lens.

As a negative-lead zoom lens in which a lens unit having a negative refractive power is disposed closest to an object side, a zoom lens that is configured by first to fifth lens units having negative, positive, positive, negative, and positive refractive powers, in order from an object side to an image side, and that moves each lens unit to perform a zooming operation is known. Japanese Patent Laid-Open No. H07-306362 discloses a zoom lens that has a wide shooting angle of 65 to 80 degrees and an F-number of 3.2.

A zoom lens that is configured by first to fourth lens units having negative, positive, negative, and positive refractive powers, in order from the object side to the image side, and that moves each lens unit to perform a zooming operation is known. U.S. Pat. No. 8,189,074 discloses a zoom lens with a wide angle of view that has the second lens unit divided into a front unit and a rear unit and that is configured by performing a focusing operation using the front unit.

In addition, a camera that has a function of displaying image data obtained by an image pickup element on a displaying element of a camera body (a live-view function) is known. In such a camera, a mirrorless camera by which a shooting image can be confirmed using the live-view function is known. Since the mirrorless camera does not have a quick return mirror (QRM), the camera can be easily thinned and a size of the camera can be reduced.

In the mirrorless camera, it is difficult to dispose a ranging element arranged in a mirror box housing the QRM to perform an autofocus (hereinafter, referred to as an "AF") using a phase difference method without increasing a thickness of the camera. Accordingly, in the mirrorless camera, the AF of a contrast detection method that performs an in-focus operation based on a contrast of image data outputted from the image pickup element is used in many cases.

In the AF of the contrast detection method, a focus lens unit is driven in an optical axis direction at high speed, and an in-focus position is calculated based on a change of the contrast of the image (a wobbling operation). Therefore, in an image pickup lens that corresponds to the contrast AF, the focus lens unit is required to be small and lightweight.

A zoom lens which uses a small-size and lightweight lens unit as a focusing lens unit so as to perform a high-speed AF is known. U.S. Pat. No. 7,184,221 discloses a zoom lens with a wide angle of view that is configured by first to sixth lens units having negative, positive, negative, positive, negative, and positive refractive powers, in order from the object side to the image side, and that performs a focusing operation using a small-size and lightweight fifth lens unit.

The zoom lens disclosed in Japanese Patent Laid-Open No. H07-306362 sets a combined focal length of the third lens unit and the fourth lens unit so as to shorten a back focus and also shorten a total lens length. However, since a length on an optical axis from a lens surface closest to the object side of the focus lens unit to a lens surface closest to the image side compared to a moving space of the focus lens unit is long, it is difficult to focus on a near distance object. In addition, since the focus lens unit is relatively heavy, it is difficult to perform a quick in-focus operation such as a wobbling operation.

The zoom lens disclosed in U.S. Pat. No. 8,189,074 moves the front unit that is a part of the second lens unit to perform the focusing operation. However, since it has a refractive power arrangement where the back focus is long, it is difficult to shorten the total lens length.

SUMMARY OF THE INVENTION

The present invention provides a zoom lens capable of easily performing a high-speed focusing with a wide angle of view by appropriately setting a refractive power of each lens unit, a lens configuration, or the like, in a negative lead type zoom lens, and also provides an image pickup apparatus including the zoom lens.

A zoom lens as one aspect of the present invention includes a first lens unit having a negative refractive power, a second lens unit having a positive refractive power, a third lens unit having a positive refractive power, a fourth lens unit having a negative refractive power, and a fifth lens unit having a positive refractive power, in an order from an object side to an image side, and an aperture stop disposed between a lens surface closest to the image side of the second lens unit and a lens surface closest to the object side of the fourth lens unit. An interval of each lens unit is configured to be changed in zooming, the first lens unit, in order from the object side to the image side, consists of one or two negative lenses and one positive lens, the second lens unit consists of one lens component that moves to the image side in focusing on an object at an infinite distance to a short distance object, and following conditional expressions are satisfied:

$$-0.60 < f23w/f4Rw < -0.01$$

$$0.1 < D2/D23w < 1.0$$

where $D23w$ is an interval between the second lens unit and the third lens unit when focusing on the object at an infinite distance at a wide angle end, $f23w$ is a combined focal length of the second lens unit and the third lens unit when focusing on the object at an infinite distance at the wide angle end, $f4Rw$ is a combined focal length of each lens unit at the image side relative to the third lens unit when focusing on the object at an infinite distance at the wide angle end, and $D2$ is a length on an optical axis from a lens surface closest to the object side of the second lens unit to the lens surface closest to the image side of the second lens unit.

An image pickup apparatus as another aspect of the present invention includes the zoom lens, and a photoelectric conversion element configured to receive an image formed by the zoom lens.

Further features and aspects of the present invention will become apparent from the following description of exemplary embodiments with reference to the attached drawings.

DESCRIPTION OF THE EMBODIMENTS

Exemplary embodiments of the present invention will be described below in details with reference to the accompanied drawings. A zoom lens of the present invention, in order from an object side to an image side, includes a first lens unit having a negative refractive power, a second lens unit having a positive refractive power, a third lens unit having a positive refractive power, a fourth lens unit having a negative refractive power, and a fifth lens unit having a positive refractive power. In addition, an aperture stop is disposed between a lens surface closest to the image side of the second lens unit and a lens surface closest to the object side of the fourth lens unit, and an each of intervals of the lens units changes in a zooming operation.

Figure 1:
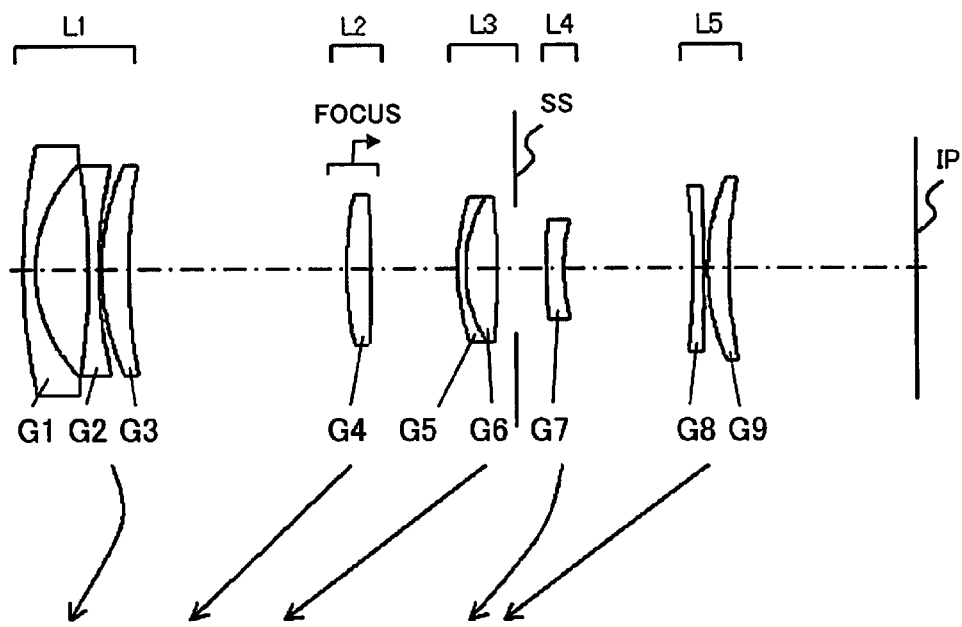
FIG. 1 is a cross-sectional diagram of a zoom lens at a wide angle end in Embodiment 1.
Figure 2A:
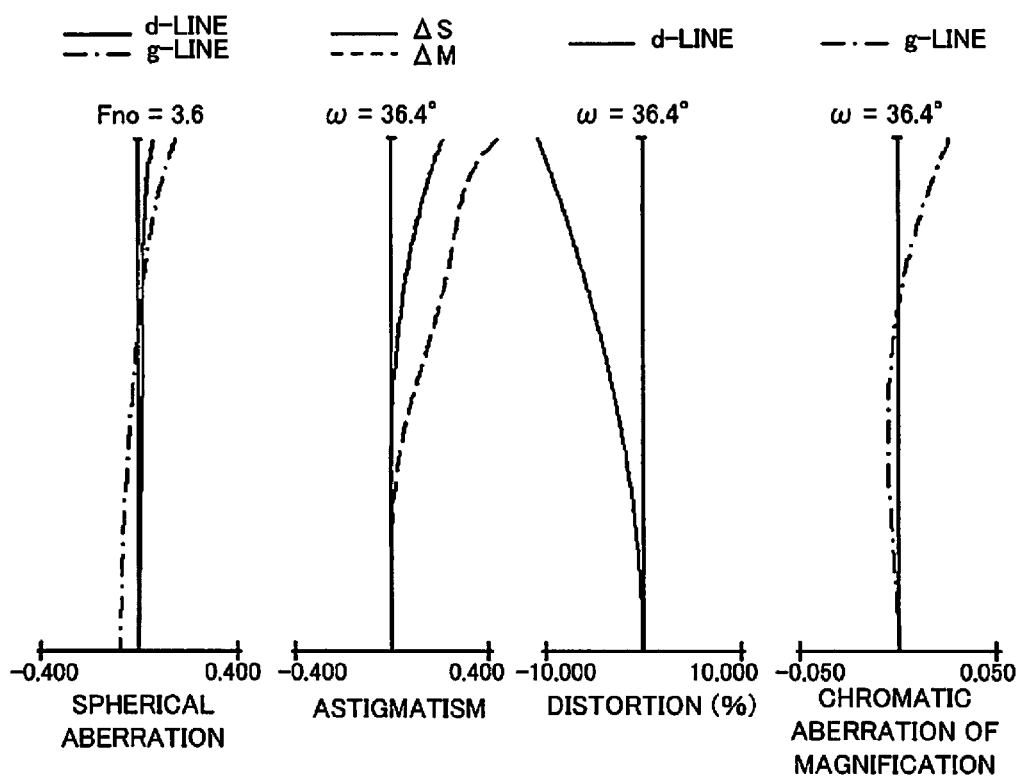
FIGS. 2A to 2C are aberration diagrams of the zoom lens at a wide angle end, an intermediate zoom position, and a telephoto end in Embodiment 1, respectively.
Figure 2B:
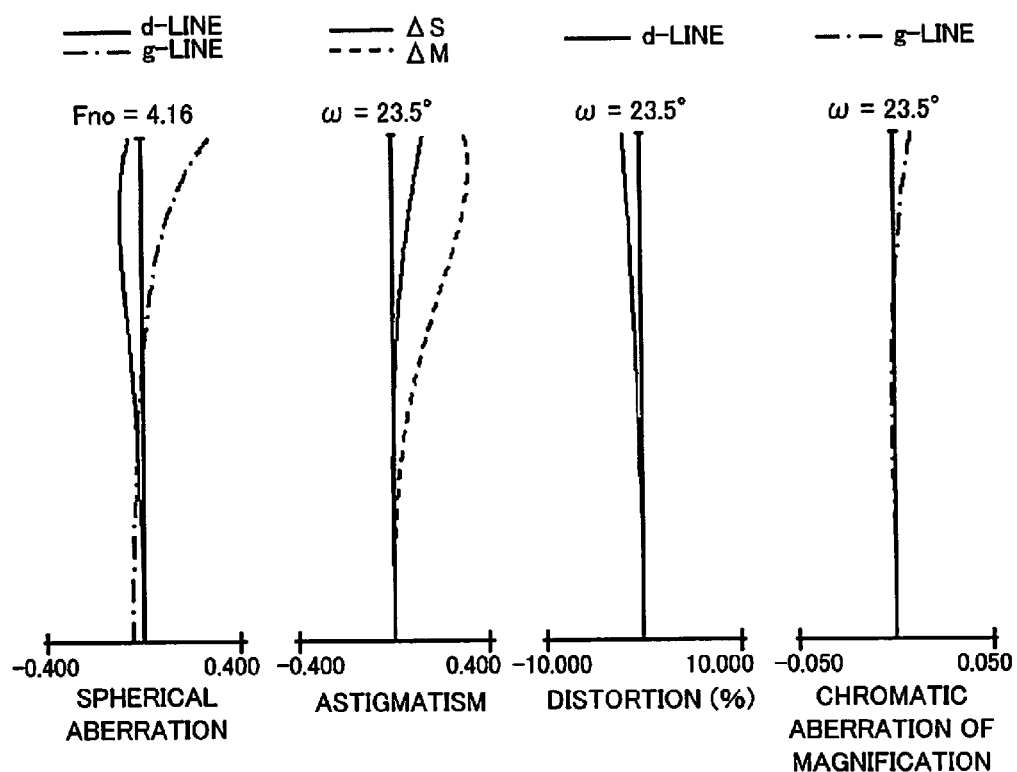
Figure 2C:
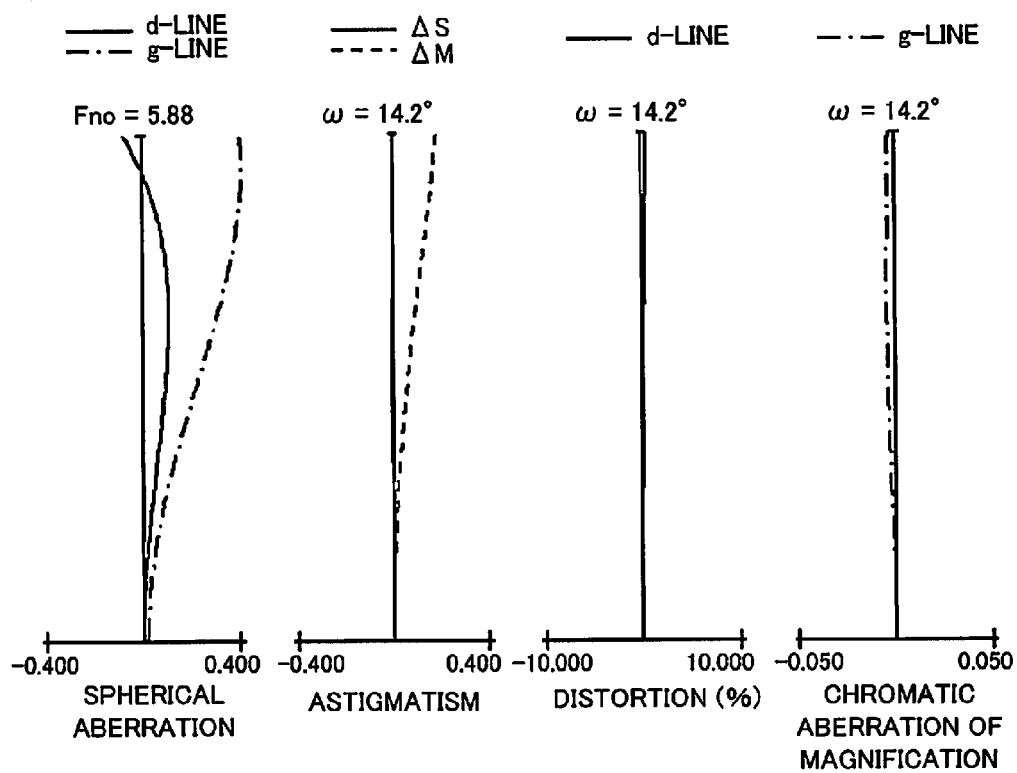
Figure 3:
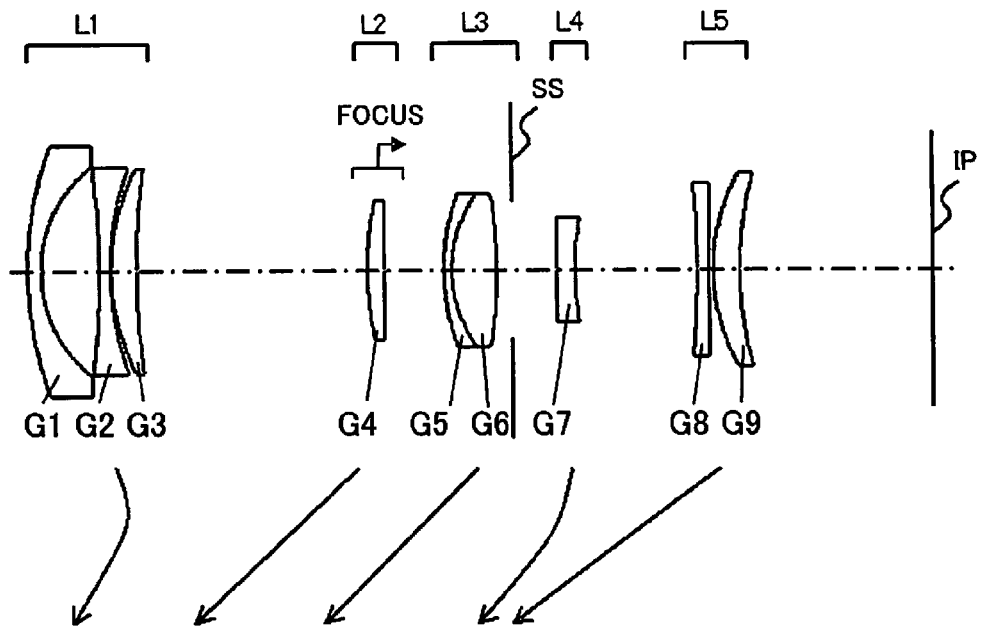
FIG. 3 is a cross-sectional diagram of a zoom lens at a wide angle end in Embodiment 2.
Figure 4A:
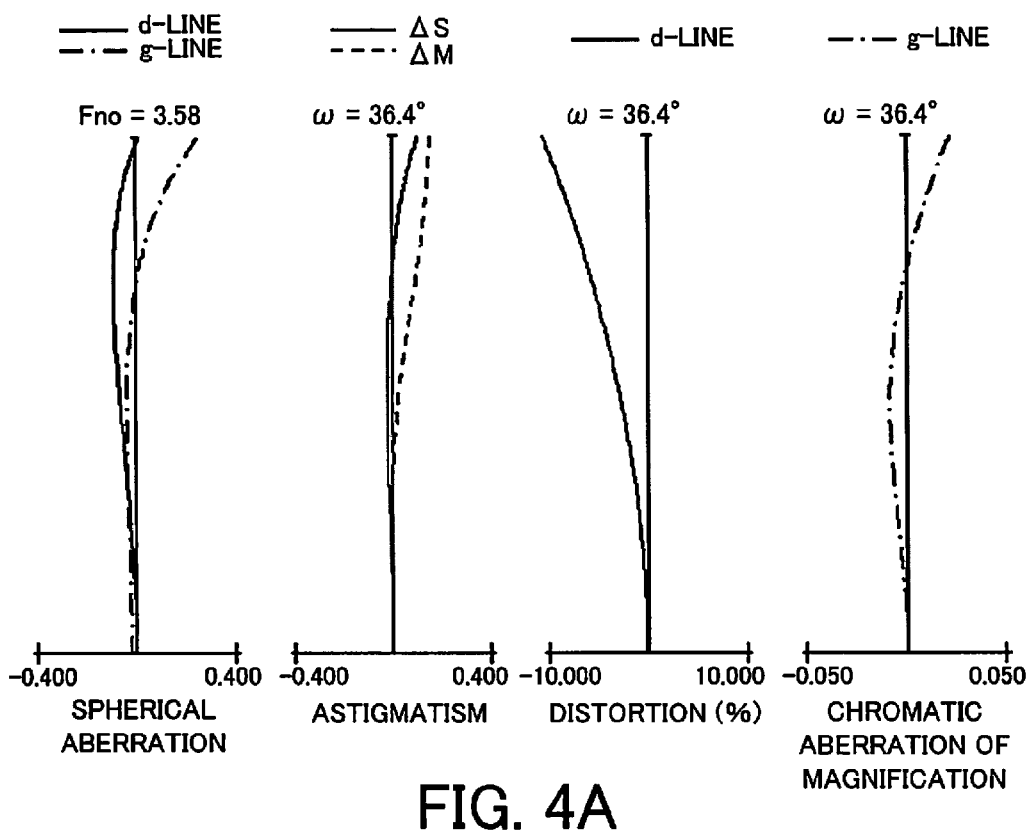
FIGS. 4A to 4C are aberration diagrams of the zoom lens at a wide angle end, an intermediate zoom position, and a telephoto end in Embodiment 2, respectively.
Figure 4B:
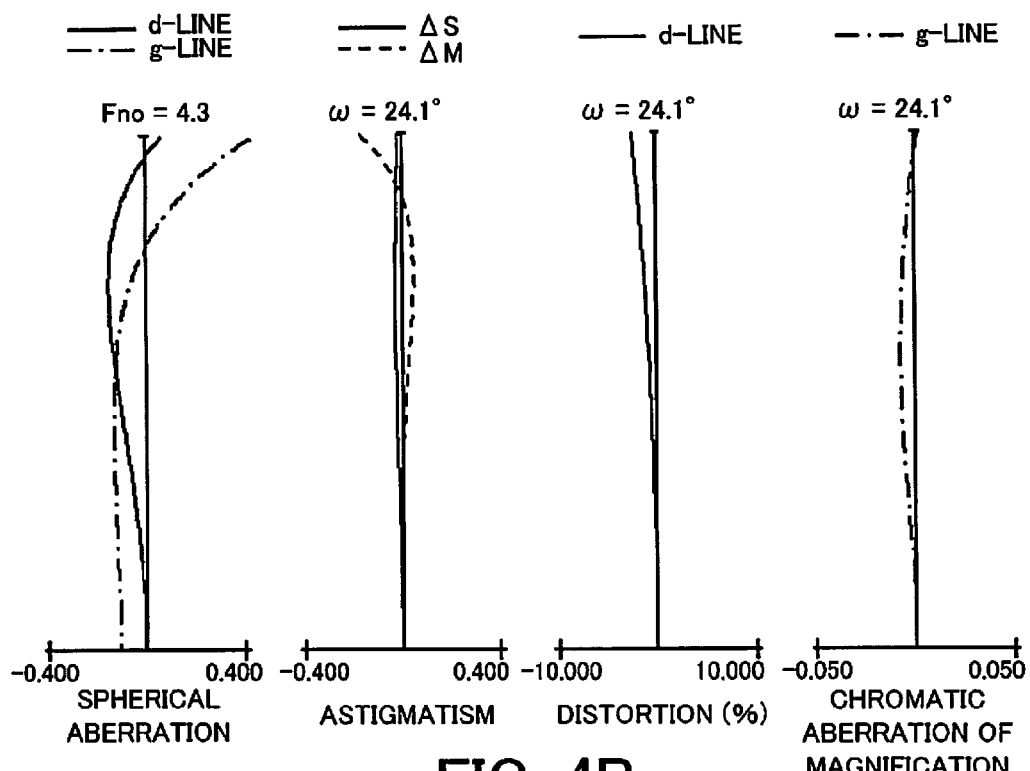
Figure 4C:
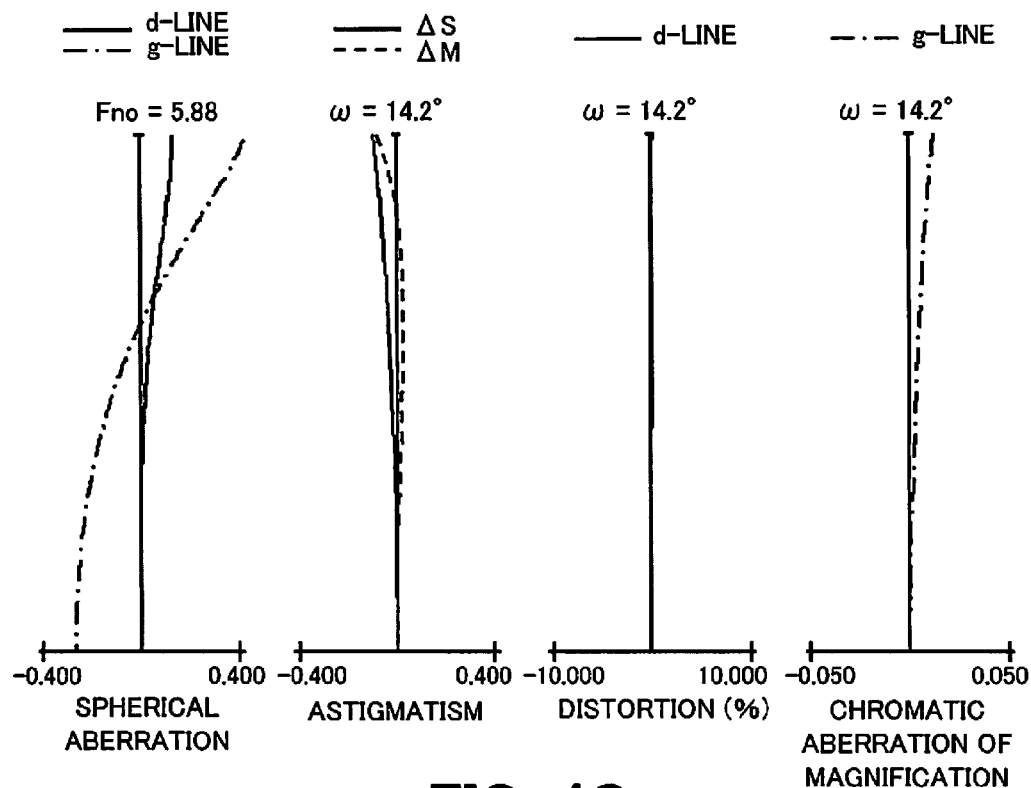

FIG. 1 is a cross-sectional diagram of a zoom lens at a wide angle end (a short focal length end) in Embodiment 1 of the present invention. FIGS. 2A to 2C are aberration diagrams of the zoom lens of Embodiment 1 at a wide angle end, an intermediate zoom position, and a telephoto end (a long focal length end), respectively. FIG. 3 is a cross-sectional diagram of a zoom lens at a wide angle end in Embodiment 2 of the present invention. FIGS. 4A to 4C are aberration diagrams of the zoom lens of Embodiment 2 at a wide angle end, an intermediate zoom position, and a telephoto end, respectively.

Figure 5:
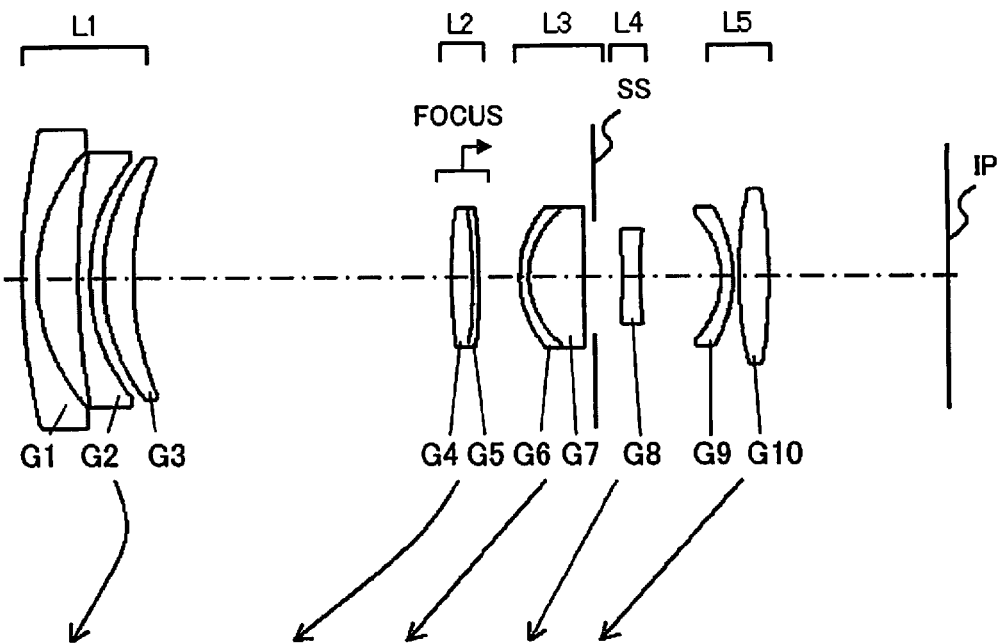
FIG. 5 is a cross-sectional diagram of a zoom lens at a wide angle end in Embodiment 3.
Figure 6A:
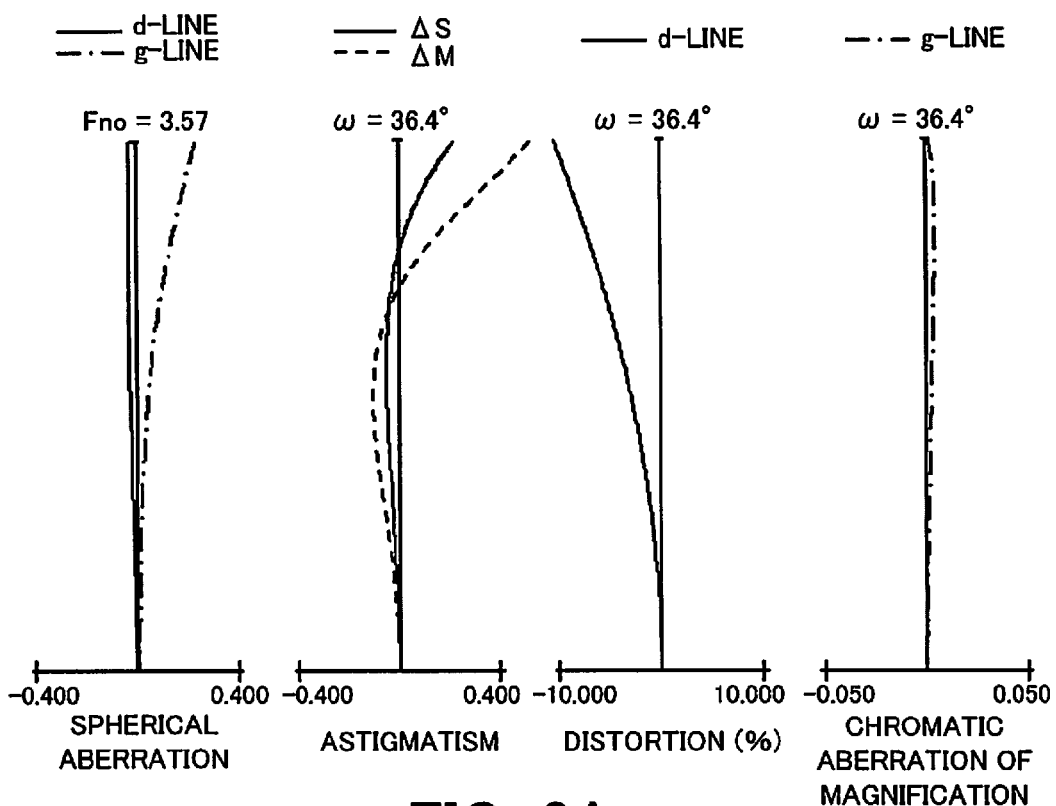
FIGS. 6A to 6C are aberration diagrams of the zoom lens at a wide angle end, an intermediate zoom position, and a telephoto end in Embodiment 3, respectively.
Figure 6B:
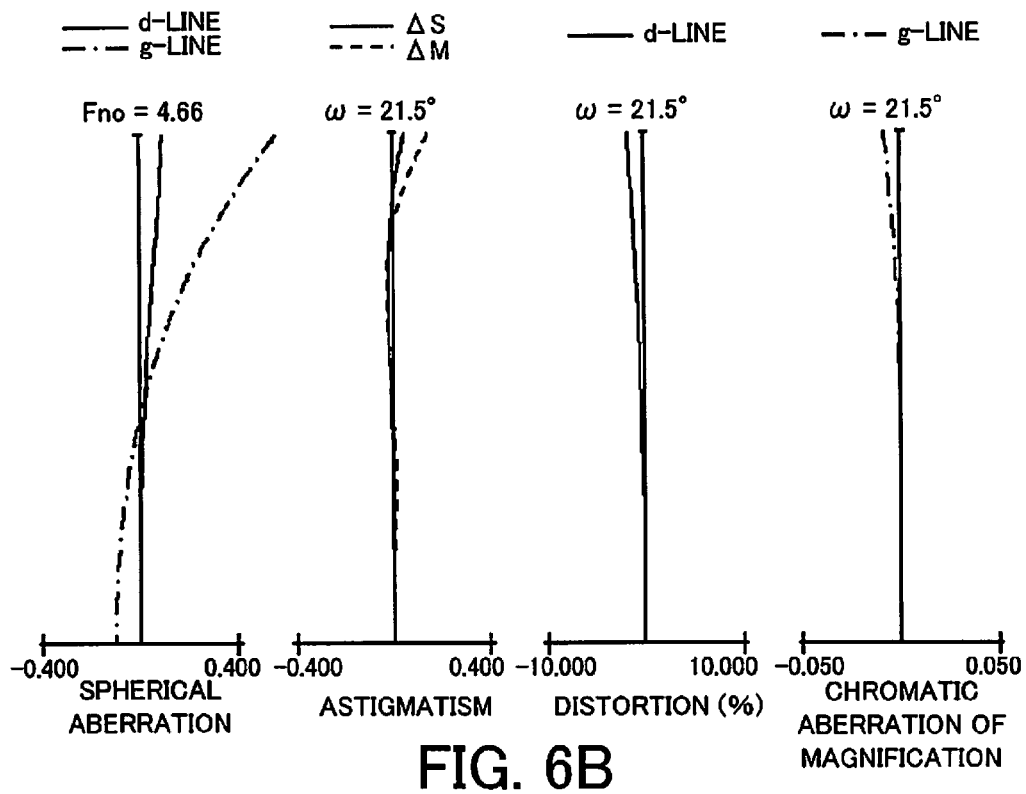
Figure 6C:
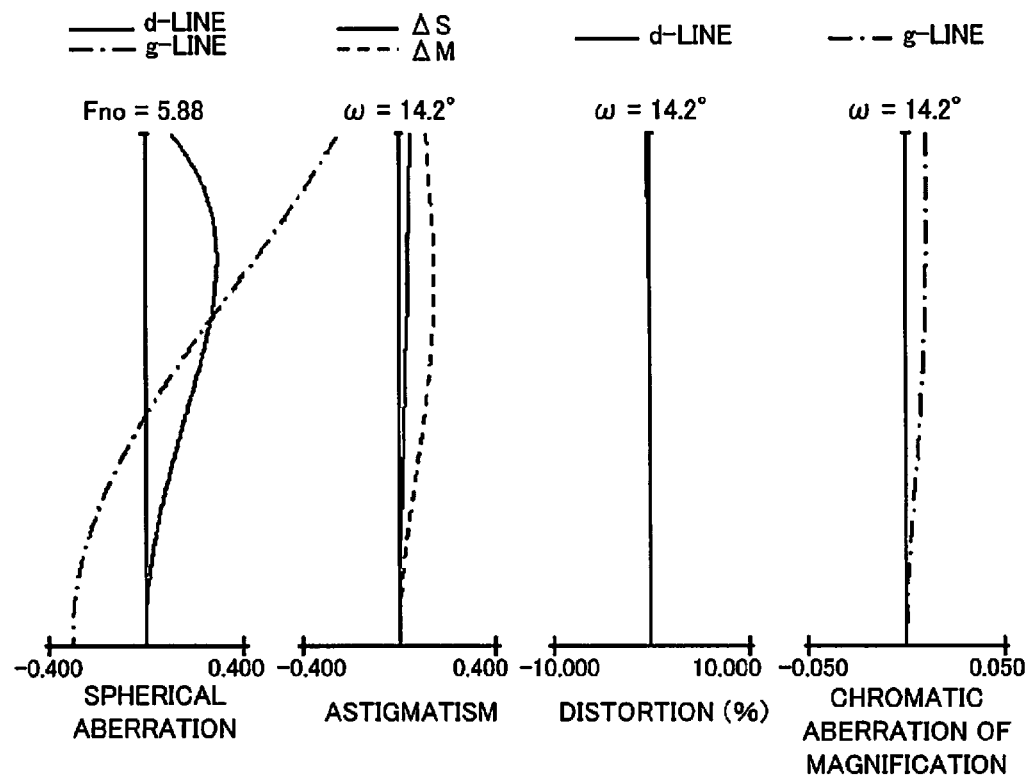
Figure 7:
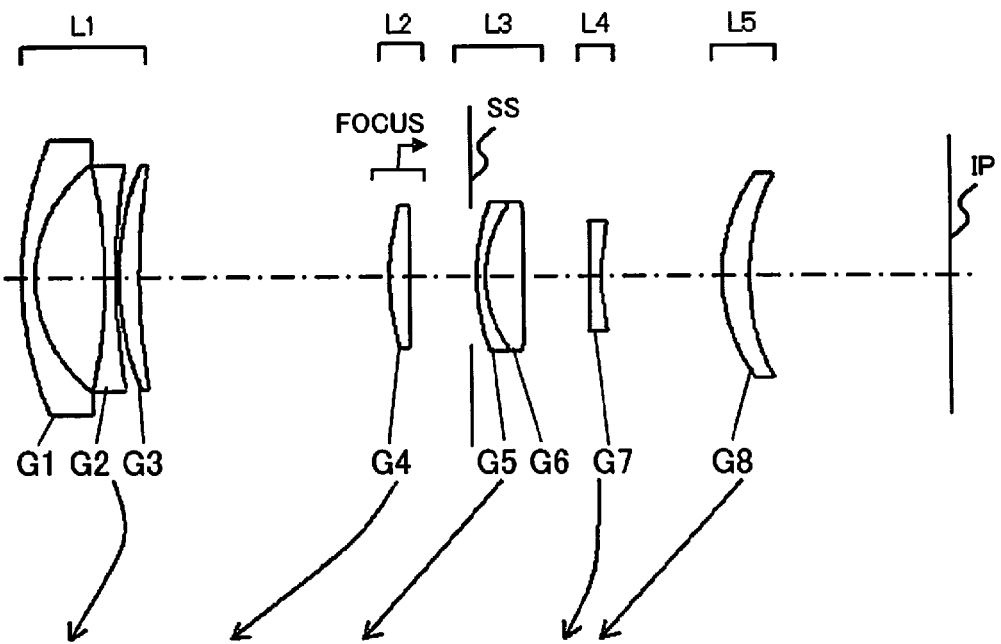
FIG. 7 is a cross-sectional diagram of a zoom lens at a wide angle end in Embodiment 4.
Figure 8A:
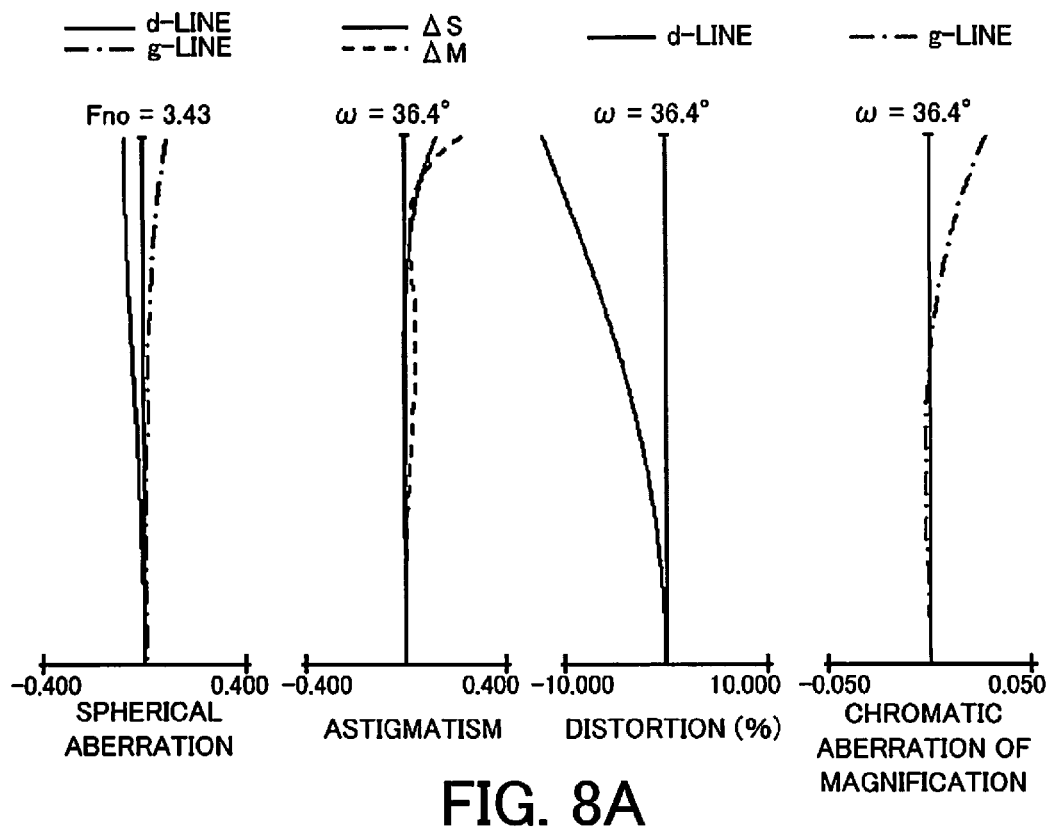
FIGS. 8A to 8C are aberration diagrams of the zoom lens at a wide angle end, an intermediate zoom position, and a telephoto end in Embodiment 4, respectively.
Figure 8B:
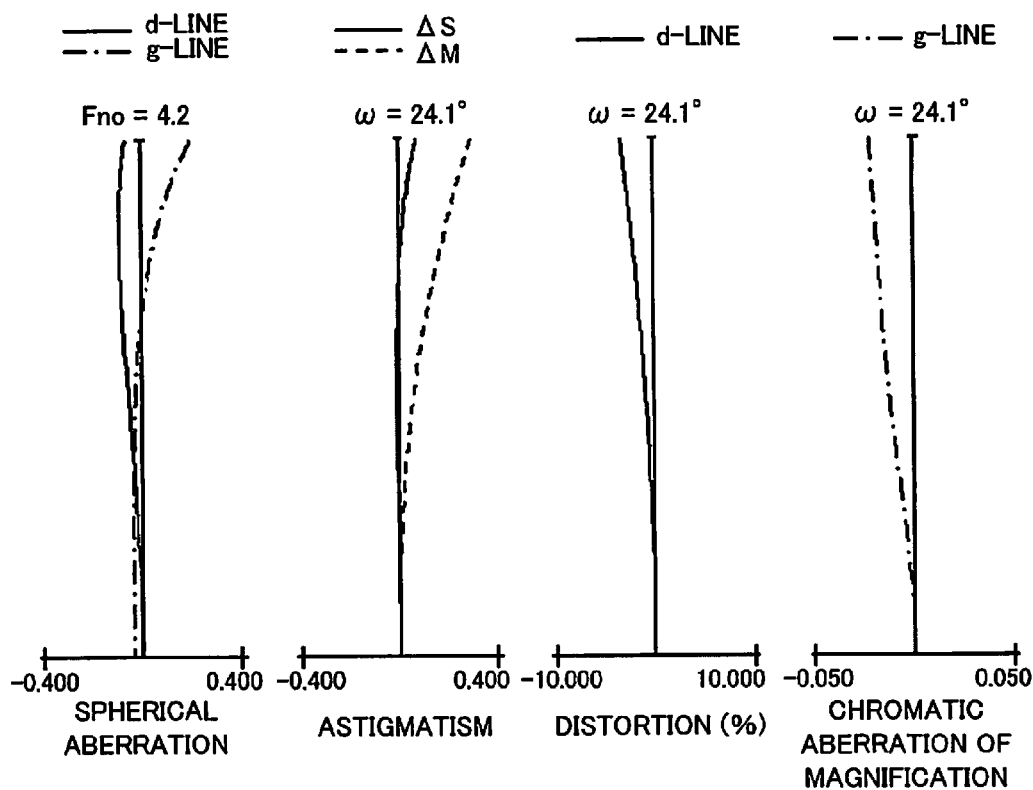
Figure 8C:
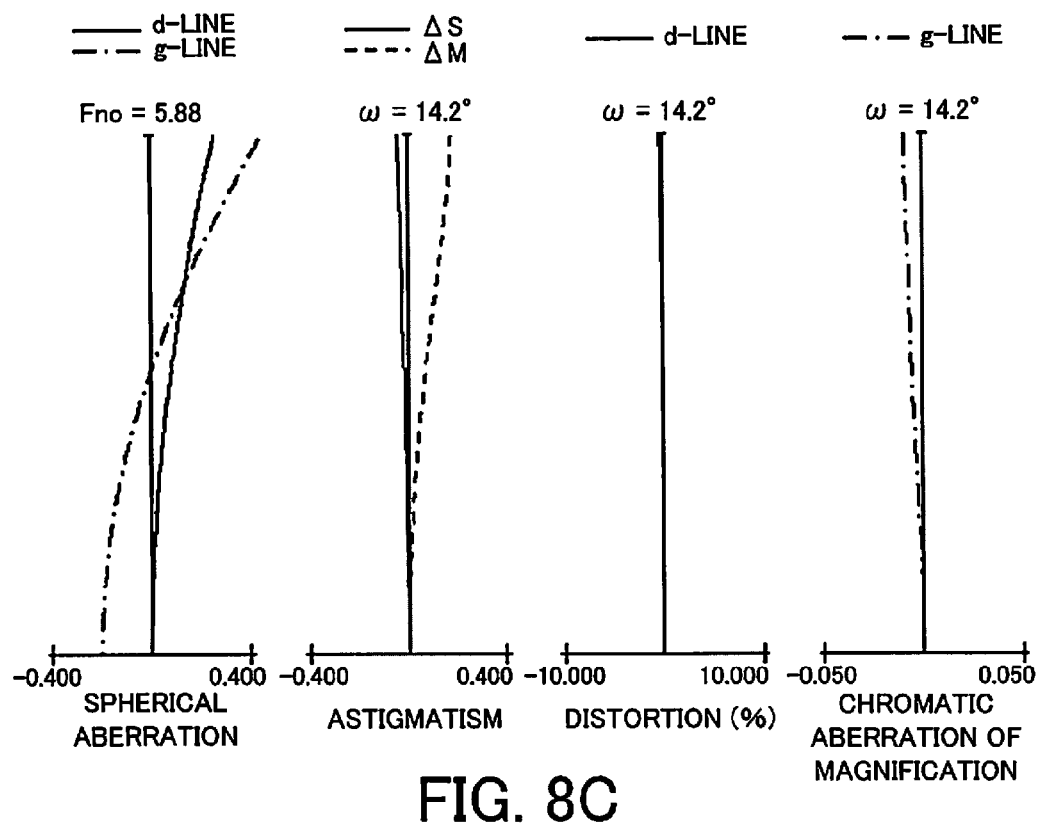

FIG. 5 is a cross-sectional diagram of a zoom lens at a wide angle end in Embodiment 3 of the present invention. FIGS. 6A to 6C are aberration diagrams of the zoom lens of Embodiment 3 at a wide angle end, an intermediate zoom position, and a telephoto end, respectively. FIG. 7 is a cross-sectional diagram of a zoom lens at a wide angle end in Embodiment 4 of the present invention. FIGS. 8A to 8C are aberration diagrams of the zoom lens of Embodiment 4 at a wide angle end, an intermediate zoom position, and a telephoto end, respectively.

Figure 9:
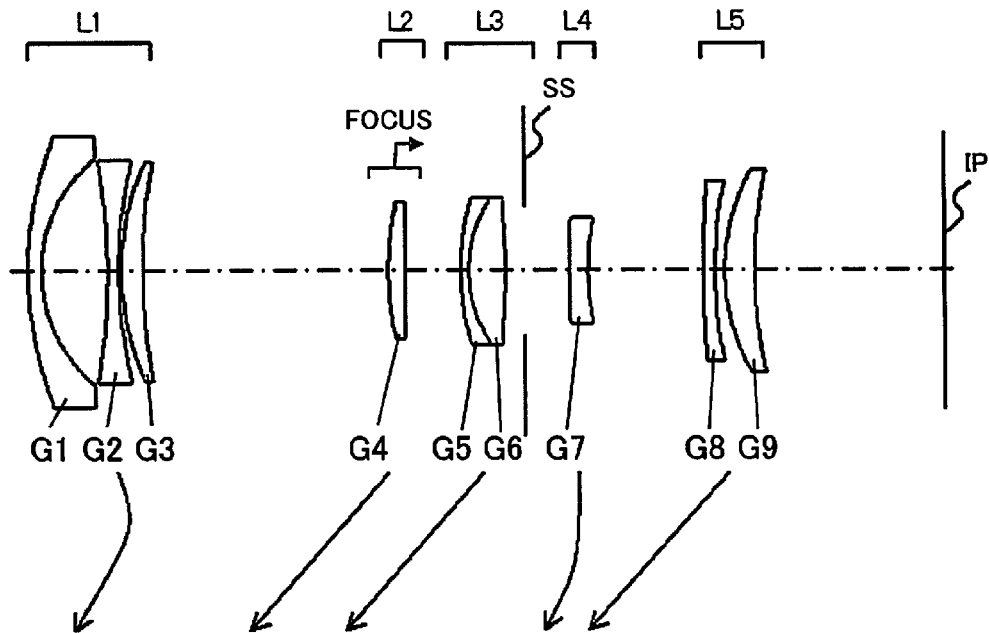
FIG. 9 is a cross-sectional diagram of a zoom lens at a wide angle end in Embodiment 5.
Figure 10A:
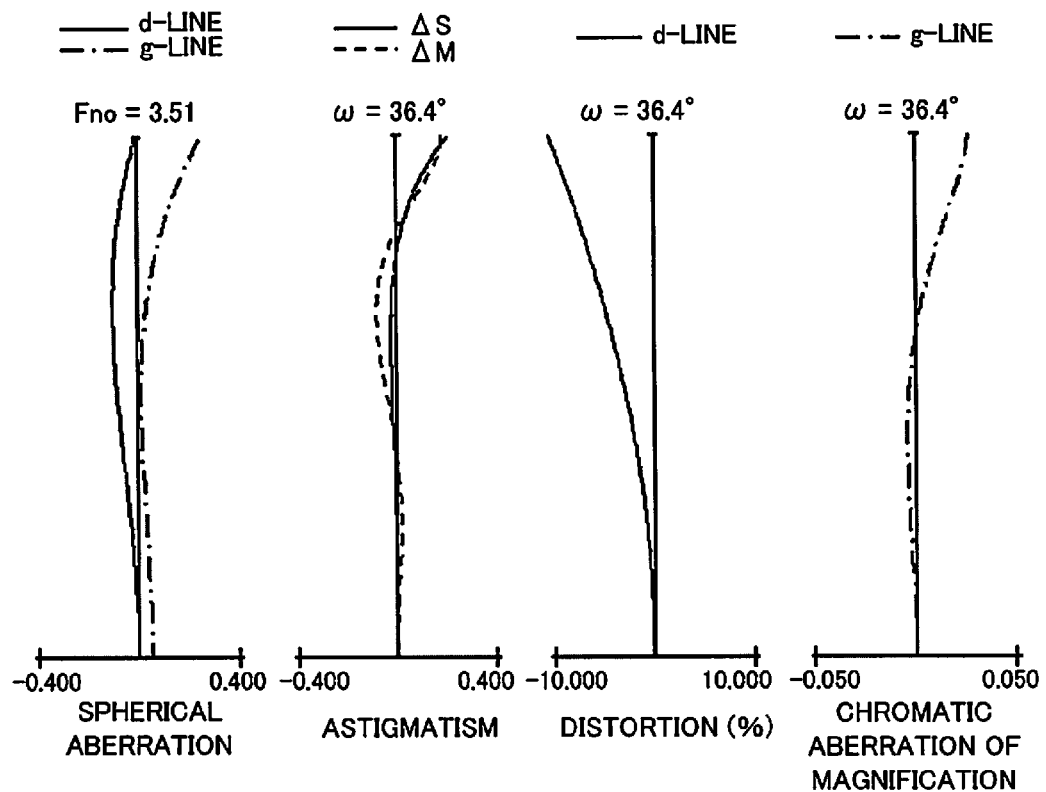
FIGS. 10A to 10C are aberration diagrams of the zoom lens at a wide angle end, an intermediate zoom position, and a telephoto end in Embodiment 5, respectively.
Figure 10B:
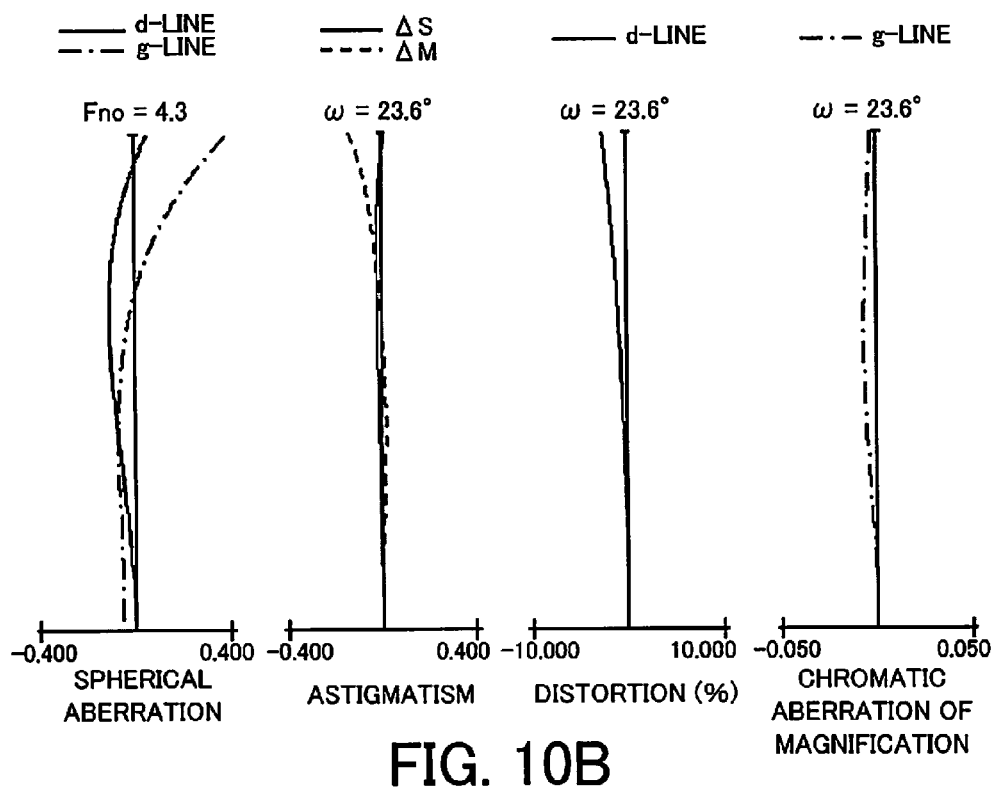
Figure 10C:
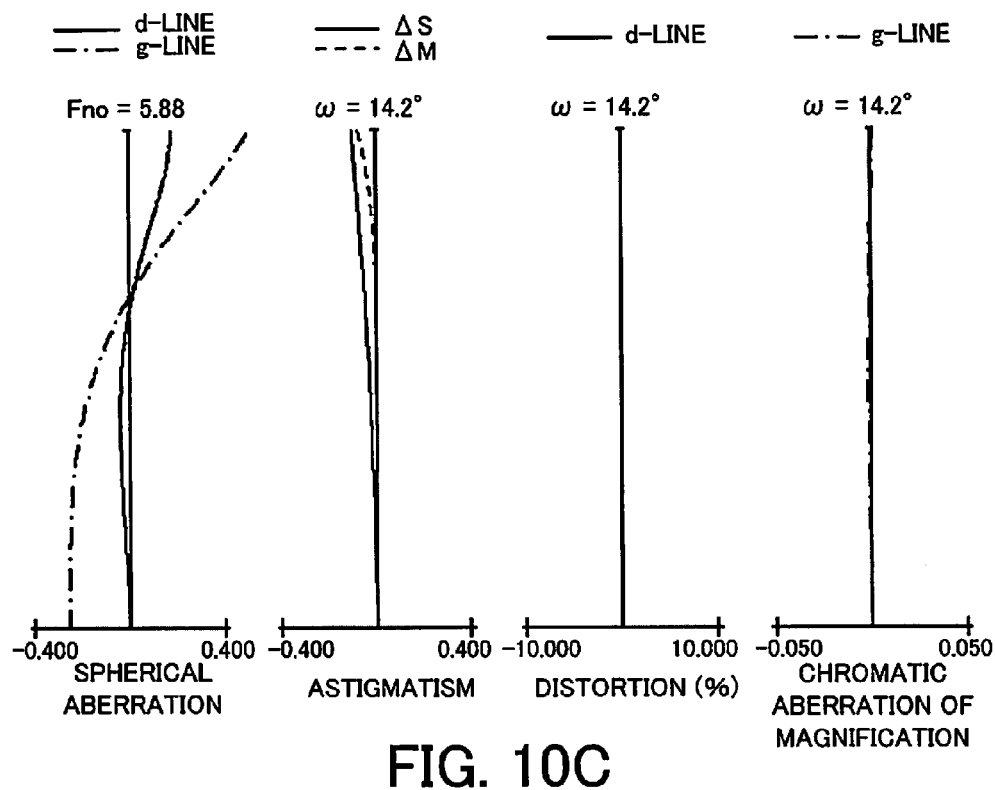
Figure 11:
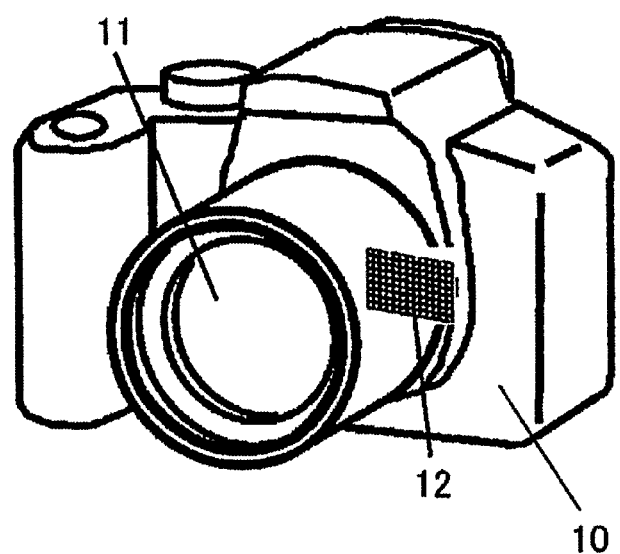
FIG. 11 is a schematic diagram of a main part of an image pickup apparatus in the present invention.

FIG. 9 is a cross-sectional diagram of a zoom lens at a wide angle end in Embodiment 5 of the present invention. FIGS. 10A to 10C are aberration diagrams of the zoom lens of Embodiment 5 at a wide angle end, an intermediate zoom position, and a telephoto end, respectively. FIG. 11 is a schematic diagram of a main part of an image pickup apparatus in the present invention. The zoom lens of each embodiment is an image pickup lens system that is used for an image pickup apparatus such as a video camera or a digital camera.

In each of the cross-sectional diagrams of the zoom lens, a left side is the object side (a front side) and a right side is the image side (a rear side). In each of the cross-sectional diagrams, symbol Li denotes an i-th lens unit where symbol i denotes a number of lens units in order from the object side. Symbol SS denotes an aperture stop. Symbol IP denotes an image plane. The image plane IP corresponds to an image pickup surface of a solid-state image pickup element (a photoelectric conversion element) such as a CCD sensor or a CMOS sensor when the zoom lens is used as an image pickup optical system of a digital camera, a video camera, or a surveillance camera. The image plane IP corresponds to a film surface when the zoom lens is used as an image pickup optical system of a silver-salt film camera.

An arrow indicates a movement locus of each lens unit in a magnification-varying operation from the wide angle end to the telephoto end. In each embodiment, the wide angle end or the telephoto end means a zoom position where a magnification-varying lens unit is located at one of both ends in a mechanically movable range on an optical axis. In the aberration diagrams, symbols d-line and g-line denote a d-line and a g-line respectively, and $\Delta M$ and $\Delta S$ are a meridional image plane and a sagittal image plane, respectively. A chromatic aberration of magnification is represented by using the g-line. Symbol $\omega$ denotes a half angle of view, and Fno denotes an F-number.

All the embodiments, in order from the object side to the image side, includes a first lens unit L1 having a negative refractive power, a second lens unit L2 having a positive refractive power, a third lens unit L3 having a positive refractive power, a fourth lens unit L4 having a negative refractive power, and a fifth lens unit L5 having a positive refractive power. One or more lens units having a positive or negative refractive power may also be disposed at the image side relative to the fifth lens unit L5. An aperture stop SS is disposed between a lens surface at the image side of the second lens unit L2 and a lens surface at the object side of the fourth lens unit L4. In the zooming operation, the interval of each lens units is changed.

Specifically, in the zooming operation from the wide angle end to the telephoto end, the first lens unit L1 moves to the image side and then moves to the object side so as to form a reciprocating movement locus or substantially reciprocating movement locus, and thus a total lens length in the intermediate zoom region is shortened. In addition, the aperture stop is disposed at the image side relative to the second lens unit L2 so that the interval between the first lens unit L1 and the second lens unit L2 becomes narrower at the telephoto end. Since the interval between the first lens unit L1 and the second lens unit L2 is narrow, a reduction in size of an optical system at the telephoto end is achieved, and also moving amounts of the second lens unit L2 and the third lens unit L3 that have a magnification-varying function are ensured so as to maximize a magnification-varying ratio.

The second lens unit L2 and the fourth lens unit L4 move to the object side along the movement loci different from each other. The third lens unit L3 and the fifth lens unit L5 move to the object side along the same movement locus. In each embodiment, the first lens unit L1 is, in order from the object side to the image side, configured by one or two negative lenses and one positive lens. The second lens unit L2 is configured by one lens component, which moves to the image side in the focusing from an object at an infinite distance to a short distance object.

In each embodiment, an interval between the second lens unit L2 and the third lens unit L3 when focusing on the object at an infinite distance at the wide angle end and a combined focal length of the second lens unit L2 and the third lens unit L3 in this state are denoted by D23w and f23w, respectively. A combined focal length of each lens unit at the image side relative to the third lens unit L3 (the fourth lens unit L4 and the fifth lens unit L5 in each embodiment) when focusing on the object at an infinite distance at the wide angle end is denoted by f4Rw. A length (a distance) on the optical axis from a lens surface closest to the object side of the second lens unit L2 to a lens surface closest to the image side of the second lens unit L2 is denoted by D2. In this case, the following conditional expressions are satisfied.

$$-0.60 < f23w/f4Rw < -0.01 \quad (1)$$

$$0.1 < D2/D23w < 1.0 \quad (2)$$

When viewing a total system as a three-unit zoom lens in which a lens unit having a negative refractive power is disposed in front, refractive powers are set so as to have an arrangement of lens units having negative, positive, and negative refractive powers at the wide angle end, and thus a lens back is shortened and the total lens length at the wide angle end is shortened so as to achieve the reduction in size of the total system.

Arranging the position of the aperture stop SS between the lens surface at the image side of the second lens unit L2 and the lens surface at the object side of the fourth lens unit L4, an exit pupil position at the wide angle end is controlled so as not to be too close to the image plane, and telecentricity that can appropriately adapt to an image pickup element is ensured. In addition, thinning the thickness of the second lens unit L2 so as to have a configuration in which a minimum movement space for focusing is ensured between the second lens unit L2 and the third lens unit L3, the reduction in size of the total system and an inner focus using a lightweight lens unit are achieved.

Since the first lens unit L1 is, in order from the object side to the image side, configured by one or two negative lenses and one positive lens, a reduction in size of a front lens effective diameter is achieved. In addition, since the second lens unit L2 that is a focus lens unit is configured by one lens component, reductions in size and weight of the focus lens unit are achieved. In the embodiment, the lens component means a single lens or a cemented lens.

Conditional Expression (1) relates to a ratio of a combined focal length of the second lens unit L2 and the third lens unit L3 with respect to a combined focal length of each of lens unit at the image side relative to the third lens unit L3 when focusing on the object at an infinite distance at the wide angle end. Conditional Expression (2) relates to a ratio of a thickness of the second lens unit L2 having the positive refractive power that is a focus lens unit and a lens unit interval between the second lens unit L2 and the third lens unit L3 at the time of focusing on the object at an infinite distance at the wide angle end.

The total lens length is shortened at the wide angle end since the refractive power arrangement is configured so as to satisfy Conditional Expression (1), and the increase of the size of the total lens length is suppressed and also the inner focus is achieved by the second lens unit L2 since the lens is configured so as to satisfy Conditional Expression (2). When a value exceeds the upper limit of Conditional Expression (1), a negative refractive power of the combined lens unit of each lens unit at the image side relative to the third lens unit L3 becomes too weak compared to a positive refractive power of the combined lens unit of the second lens unit L2 and the third lens unit L3.

In this case, when a focal length of the total system is constant, a telephoto degree of a partial system that is configured by the combined lens unit of the second lens unit L2 and the third lens unit L3 and the combined lens unit of each lens unit at the image side relative to the third lens unit L3 is too weak. As a result, the back focus is too long and the total lens length is increased at the wide angle end.

On the other hand, the value exceeds the lower limit, a negative refractive power of the combined lens unit of each lens unit at the image side relative to the third lens unit L3 becomes too strong compared to a positive refractive power of the combined lens unit of the second lens unit L2 and the third lens unit L3. In this case, when the focal length of the total system is constant, the telephoto degree of the partial system that is configured by the combined lens unit of the second lens unit L2 and the third lens unit L3 and the combined lens unit of each lens unit at the image side relative to the third lens unit L3 is too strong. As a result, the back focus becomes too short.

When the zoom lens is used as an interchangeable lens, it is difficult to dispose a shutter unit or the like at the image side of the lens system. In addition, an exit pupil comes too close to the image plane, and thus it is not appropriate since an incident angle of ray onto the image pickup element becomes too large.

When a value exceeds the upper limit of Conditional Expression (2), the second lens unit L2 that is a focus lens unit is too thick and therefore a weight of the lens is increased, or the lens unit interval between the second lens unit L2 and the third lens unit L3 becomes too narrow and therefore a space that is necessary for the focusing is insufficient. On the other hand, when the value exceeds the lower limit, the second lens unit L2 that is the focus lens unit is too thin and therefore it is difficult to process the lens or the lens unit interval between the second lens unit L2 and the third lens unit L3 becomes too wide and therefore it is not appropriate since the total lens length is increased.

In each embodiment, it is preferred that numerical ranges of Conditional Expressions (1) and (2) are set as follows.

$$-0.50 < f23w/f4Rw < -0.01 \quad (1a)$$

$$0.15 < D2/D23w < 0.90 \quad (2a)$$

In each embodiment, it is more preferred that numerical ranges of Conditional Expressions (1a) and (2a) are set as follows.

$$-0.40 < f23w/f4Rw < -0.02 \quad (1b)$$

$$0.2 < D2/D23w < 0.8 \quad (2b)$$

As described above, according to each embodiment, in the zoom lens having a negative lens unit in front including lens units having negative, positive, positive, negative, and positive refractive powers in order from the object side, the configuration of the first lens unit L1, the configuration of the second lens unit L2, the arrangement of the aperture stop SS, the refractive power of each lens unit, and the like, are appropriately set. As a result, an inner focus zoom lens that has the total system whose size is reduced and that is easily adapted to the image pickup element can be obtained.

In the zoom lens of each embodiment, it is more preferred that at least one of the following conditional expressions is satisfied. According to this, an effect corresponding to each conditional expression is obtained.

In the embodiment, a focal length of the first lens unit L1 is denoted by f1, focal length of the second lens unit L2 is denoted by f2, a focal length of the fourth lens unit L4 is denoted by f4, a focal length of the fifth lens unit L5 is denoted by f5, and a focal length of the total system at the wide angle end is denoted by fw. A lateral magnification of the second lens unit L2 when focusing on the object at an infinite distance at the telephoto end is denoted by β2t, and a combined lateral magnification of a total of each lens unit at the image side relative to the second lens unit L2 at the telephoto end is denoted by βRt. In this case, it is preferred that at least one of the following conditional expressions is satisfied.

$$0.9 < |f1|/fw < 1.7 \quad (3)$$

$$0.9 < f23w/fw < 1.5 \quad (4)$$

$$1.4 < |f4|/fw < 3.5 \quad (5)$$

$$2.5 < f5/fw < 7.0 \quad (6)$$

$$-6.5 < (1-\beta 2t^2)*\beta Rt^2 \leq -3.0 \quad (7)$$

$$1.4 < f2/f23w < 3.2 \quad (8)$$

Next, a technical meaning of each conditional expression will be described.

Conditional Expression (3) defines the refractive power of the first lens unit L1. When a value exceeds the upper limit of Conditional Expression (3), the refractive power of the first lens unit L1 becomes too weak, and therefore the total lens length and the front lens effective diameter are increased. On the other hand, when the value exceeds the lower limit, the refractive power of the first lens unit L1 becomes too strong, and therefore it is difficult to correct a field curvature at the wide angle end.

Conditional Expression (4) defines the refractive power of the combined lens unit of the second lens unit L2 and the third lens unit L3 when focusing on the object at an infinite distance at the wide angle end. When a value exceeds the upper limit of Conditional Expression (4), the refractive power of the combined lens unit becomes too weak, and therefore a moving amount of the combined lens unit to varying the magnification and the total lens length is increased.

On the other hand, when the value exceeds the lower limit, the refractive power of the combined lens unit becomes too strong, and therefore variations of a spherical aberration and a coma aberration are increased in the zooming operation and it is difficult to correct them.

Conditional Expression (5) defines the refractive power of the fourth lens unit L4. When a value exceeds the upper limit of Conditional Expression (5), the refractive power of the fourth lens unit L4 becomes too weak, and therefore the back focus is increased and the total lens length is increased at the wide angle end. On the other hand, when the value exceeds the lower limit, the refractive power of the fourth lens unit L4 becomes too strong and the back focus becomes too short, and therefore it is not preferable since the position of the exit pupil comes close to the image plane and the incident angle of the ray onto the image pickup element becomes too large.

Conditional Expression (6) defines the refractive power of the fifth lens unit L5. When a value exceeds the upper limit of Conditional Expression (6), the refractive power of the fifth lens unit L5 becomes too weak and the back focus becomes too short, and therefore the position of the exit pupil comes close to the image plane and the incident angle of the ray onto the image pickup element becomes too large. On the other hand, when the value exceeds to lower limit, the refractive power of the fifth lens unit L5 becomes too strong and the back focus is increased, and it is not preferable since the total lens length is increased at the wide angle end.

Conditional Expression (7) defines the lateral magnifications of the second lens unit L2 when focusing on the object at an infinite distance at the telephoto end and the combined lens unit of all of the lens units at the image side relative to the second lens unit. In other words, a focus sensitivity of the second lens unit L2 at the telephoto end is defined. When a value exceeds the upper limit of Conditional Expression (7), the focus sensitivity of the second lens unit L2 at the telephoto end becomes too low, and therefore a moving amount in focusing is increased and the size of total system is increased.

On the other hand, when the value exceeds the lower limit, the focus sensitivity of the second lens unit L2 at the telephoto end becomes too high, and therefore it is difficult to perform the focusing with high accuracy at the wide angle end and the telephoto end.

Conditional Expression (8) defines a ratio of the focal length of the second lens unit L2 with respect to the focal length of the combined lens unit of the second lens unit L2 and the third lens unit L3 when focusing on the object at an infinite distance at the wide angle end.

When a value exceeds the upper limit of Conditional Expression (8), the refractive power of the second lens unit L2 becomes too weak compared to the focal length of the combined lens unit and the focus sensitivity is decreased, and therefore the moving amount in focusing is increased and the total lens length is increased. On the other hand, when the value exceeds the lower limit, the refractive power of the second lens unit L2 becomes too strong compared to the focal length of the combined lens unit, and therefore the variations of the spherical aberration and the chromatic aberration are increased in focusing, and it is difficult to correct them.

In each embodiment, the fourth lens unit L4 is configured by one lens component having a negative refractive power. Furthermore, since the fourth lens unit L4 is displaced in a direction having a component that is perpendicular to the optical axis, an imaging position is displaced in a direction perpendicular to the optical axis. In other words, a hand-shake correction (image stabilization) is performed.

In the embodiment, a lateral magnification of the fourth lens unit L4 at the wide angle end when focusing on the object at an infinite distance is denoted by βow. When a lateral magnification of the lens unit located at the image side relative to the fourth lens unit L4 at the wide angle end (or combined lens unit when a plurality of lens units are disposed at the image side relative to the fourth lens unit L4) is denoted by βRw, it is preferred that the following conditional expression is satisfied.

$$-2.0 < (1-\beta 4w)*\beta Rw < -0.4 \quad (9)$$

Conditional Expression (9) defines a sensitivity that is a ratio of an image shift with respect to a lens shift of the fourth lens unit L4 for the image stabilization. When a value exceeds the upper limit of Conditional Expression (9), the sensitivity of the fourth lens unit L4 becomes too low and a shake amount in the image stabilization is increased, and therefore the size of a drive system is increased and particularly an effective diameter of the fourth lens unit L4 is increased. On the other hand, when the value exceeds the lower limit, the sensitivity of the fourth lens unit L4 becomes too high and therefore it is difficult to perform the image stabilizing control.

In each embodiment, it is more preferred that the numerical ranges of Conditional Expressions (3) to (9) are set to the following ranges, respectively.

$$1.0 < |f1|/fw < 1.6 \quad (3a)$$

$$0.95 < f23w/fw < 1.40 \quad (4a)$$

$1.5 < |f4|/fw < 3.2$ (5a)

$2.8 < f5/fw < 6.5$ (6a)

$-6.2 < (1-\beta 2t^2)*\beta Rt^2 < -3.2$ (7a)

$1.5 < f2/f23w < 3.0$ (8a)

$-1.90 < (1-\beta 4w)*\beta Rw < -0.45$ (9a)

In each embodiment, it is further preferred that the numerical ranges of Conditional Expressions (3a) to (9a) are set to the following ranges, respectively.

$1.1 < |f1|/fw < 1.5$ (3b)

$1.0 < f23w/fw < 1.3$ (4b)

$1.6 < |f4|/fw < 3.0$ (5b)

$3.0 < f5/fw < 6.0$ (6b)

$-5.8 < (1-\beta 2t^2)*\beta Rt^2 < -3.4$ (7b)

$1.6 < f2/f23w < 2.8$ (8b)

$-1.8 < (1-\beta 4w)*\beta Rw < -0.5$ (9b)

In each embodiment, the third lens unit L3 and the fifth lens unit L5 may be moved along the same locus in the zooming operation. According to this configuration, the third lens unit L3 and the fifth lens unit L5 are easily built into the same barrel, and therefore a simplification of a mechanical structure and a high-accuracy holding of the lens units can be easily performed.

As described above, according to each embodiment, an inner focus zoom lens that is easily adapted to an image pickup element while a size of a total system is reduced can be obtained.

Next, a lens configuration of each embodiment will be described.

Embodiment 1

Referring to FIG. 1, a zoom lens of Embodiment 1 of the present invention will be described. Embodiment 1 of FIG. 1 is a five-unit zoom lens that includes a lens unit having a negative refractive power in front, which is configured by a first lens L1 to a fifth lens unit L5 having negative, positive, positive, negative, and positive refractive powers in order from the object side to the image side.

In Embodiment 1 of FIG. 1, when varying the magnification from the wide angle end to the telephoto end, as indicated by an arrow, the first lens unit L1 moves along a locus convex towards the image side so as to compensate a variation of the image plane caused by the magnification-varying operation. The second lens unit L2, the third lens unit L3, the fourth lens unit L4, and the fifth lens unit L5 are a magnification-varying lens unit, each of which moves to the object side. The aperture stop SS is disposed at the image side relative to the third lens unit L3, which moves integrally with the third lens unit L3. The third lens unit L3 and the fifth lens unit L5 move along the same locus in the zooming operation.

The first lens unit L1 is, in order from the object side to the image side, configured by a negative G1 lens that has a meniscus shape convex towards the object side, a negative G2 lens that has a biconcave shape, and a positive G3 lens that has a meniscus shape convex towards the object side. The second lens unit L2 is configured by a positive G4 lens that has a surface having an aspherical shape at the object side and that has a biconvex shape. The third lens unit L3 is, in order from the object side to the image side, configured by a cemented lens that is formed by cementing a negative G5 lens that has a meniscus shape convex towards the object side and a G6 lens that has a biconvex shape.

The fourth lens unit L4 is configured by a negative G7 lens that has a surface at the image side having an aspherical shape and that has a meniscus shape concave towards the image side. The fifth lens unit L5 is, in order from the object side to the image side, configured by a negative G8 lens that has a surface at the image side having an aspherical shape and that has a meniscus shape concave towards the object side and a positive G9 lens that has a meniscus shape convex towards the object side. The focusing from an object at an infinite distance to a finite distance object is performed by adopting an inner method which moves the second lens unit L2 to the image side on the optical axis.

In Embodiment 1, since the refractive power arrangement that satisfies Conditional Expressions (1) and (2) and the position of the aperture stop SS are appropriately set and the second lens unit L2 is configured by one positive G4 lens, a reduction in size of the total lens system and an adaptation to the image pickup element are appropriately achieved. In addition, the inner focus zoom lens is adapted to reduce the weight of the focus lens unit.

Embodiment 2

Hereinafter, referring to FIG. 3, a zoom lens of Embodiment 2 of the present invention will be described. A refractive power arrangement of each lens unit and a movement locus of each lens unit in a zooming or a focusing operation in Embodiment 2 are the same as those in Embodiment 1. A lens configuration (a lens shape) of each of the first, third to fifth lens units is the same as that of Embodiment 1. The present embodiment is different from Embodiment 1 in that the second lens unit L2 is configured by a positive G4 lens that has a surface at the object side having an aspherical shape and that has a meniscus shape convex towards the object side.

Embodiment 3

Hereinafter, referring to FIG. 5, a zoom lens in Embodiment 3 of the present invention will be described. A refractive power arrangement of each lens unit and a movement locus of each lens unit in a zooming or a focusing operation in Embodiment 3 are the same as those in Embodiment 1.

The present embodiment is different from Embodiment 1 in that a lens configuration of a part of lens units is different. The first lens unit L1 is, in order from the object side to the image side, configured by a negative G1 lens that has a meniscus shape convex towards the object side, a negative G2 lens that has a meniscus shape convex towards the object side, and a positive G3 lens that has a meniscus shape convex towards the object side. The second lens unit L2 is, in order from the object side to the image side, configured by a cemented lens that is formed by cementing a G4 lens that has a biconvex shape and a negative G5 lens that has a meniscus shape concave towards the object side.

The third lens unit L3 is, in order from the object side to the image side, configured by a cemented lens that is formed by cementing a negative G6 lens that has a meniscus shape convex towards the object side and a positive G7 lens that has a meniscus shape convex towards the object side. The fourth lens unit L4 is configured by a negative G8 lens that has a surface at the object side having an aspherical shape and that has a biconcave shape. The fifth lens unit L5 is, in order from the object side to the image side, configured by a negative G9 lens that has a surface at the image side having an aspherical shape and that has a meniscus shape concave towards the object side and a positive G10 lens that has a biconvex shape.

In Embodiment 3, since the refractive power arrangement that satisfies Conditional Expressions (1) and (2) and the position of the aperture stop SS are appropriately set and the second lens unit L2 is configured by one cemented lens, a reduction in size of the total lens system and an adaptation to the image pickup element are appropriately achieved. In addition, the inner focus zoom lens is adapted to reduce the weight of the focus lens unit.

Embodiment 4

Hereinafter, referring to FIG. 7, a zoom lens in Embodiment 4 of the present invention will be described. A refractive power arrangement of each lens unit and a movement locus of each lens unit in a zooming or a focusing operation in Embodiment 4 are the same as those in Embodiment 1.

The present embodiment is different from Embodiment 1 in that the lens configurations of the fourth lens unit L4 and the fifth lens unit L5 are different from those of Embodiment 1. In addition, the present embodiment is different in that the aperture stop SS is disposed at the object side relative to the third lens unit L3. The fourth lens unit L4 is configured by a negative G7 lens that has a biconcave shape. The fifth lens unit L5 is configured by a positive G8 lens that has a surface at the image side having an aspherical shape and that has a meniscus shape convex towards the object side.

Embodiment 5

Hereinafter, referring to FIG. 9, a zoom lens in Embodiment 5 of the present invention will be described. A refractive power arrangement of each lens unit and a movement locus of each lens unit in a zooming or a focusing operation in Embodiment 5 are the same as those in Embodiment 1. A lens configuration of each lens unit is the same as that of Embodiment 1.

Hereinafter, specific numerical data of Numerical Examples 1 to 5 that correspond to Embodiments 1 to 5, respectively, are indicated. In each numerical examples, symbol i denotes an order of a surface counted from the object side, symbol ri denotes a radius of curvature of an i-th optical surface (an i-th surface), symbol di denotes an axial interval between the i-th surface and the (i+1)th surface, and symbols ndi and vdi denote a refractive index and Abbe number of the material of the i-th optical member with respect to the d-line, respectively.

An aspherical shape is represented by the following expression, where a traveling direction of light is positive, symbol x denotes a displacement in an optical axis direction from an apex of a surface, symbol h denotes a height from the optical axis in a direction perpendicular to the optical axis, symbol r denotes a paraxial radius of curvature, symbol K denotes a conic constant, and symbols A4, A6, A8, and A10 denote aspherical coefficients.

$$x=(h^2/r)/[1+\{1-(1+K)\times(h/r)^2\}^{1/2}]+A4\times h^4+A6\times h^6+A8\times h^8+A10\times h^{10} \quad (10)$$

The description of "E±XX" in each of aspherical surface coefficients (in each of aspherical surface data) means "×10$^{\pm XX}$" Table 1 indicates a relationship between each conditional expression described above and the numerical examples.

(Numerical Example 1)

Unit mm

Surface data

| Surface Number | r | d | nd | vd | Effective diameter |
|---|---|---|---|---|---|
| 1 | 61.404 | 1.30 | 1.80400 | 46.6 | 24.94 |
| 2 | 15.798 | 5.57 | | | 21.10 |
| 3 | −69.171 | 1.10 | 1.77250 | 49.6 | 20.81 |
| 4 | 47.063 | 0.33 | | | 20.57 |
| 5 | 27.077 | 2.80 | 1.92286 | 20.9 | 20.84 |
| 6 | 63.057 | (variable) | | | 20.39 |
| 7* | 37.271 | 2.60 | 1.58313 | 59.4 | 14.64 |
| 8 | −109.442 | (variable) | | | 14.14 |
| 9 | 24.139 | 0.80 | 1.84666 | 23.8 | 14.04 |
| 10 | 14.164 | 3.40 | 1.64000 | 60.1 | 13.75 |
| 11 | −63.859 | 2.00 | | | 13.66 |
| 12(stop) | ∞ | (variable) | | | 13.05 |
| 13 | 132.978 | 1.80 | 1.55332 | 71.7 | 9.59 |
| 14* | 23.572 | (variable) | | | 9.16 |
| 15 | −64.653 | 1.20 | 1.58306 | 30.2 | 15.52 |
| 16* | −73.213 | 0.30 | | | 16.12 |
| 17 | 24.508 | 2.20 | 1.58313 | 59.4 | 17.65 |
| 18 | 47.729 | (variable) | | | 17.79 |
| Image plane | ∞ | | | | |

Aspherical surface data

Seventh surface

K = 0.00000e+000   A4 = −1.32540e−005   A6 = −6.53558e−010
A8 = −5.17941e−011

Fourteenth surface

K = 0.00000e+000   A4 = −7.07988e−007   A6 = −2.40702e−007
A8 = 4.17993e−009

Sixteenth surface

K = 0.00000e+000   A4 = 3.24846e−005   A6 = 2.27137e−007
A8 = −2.19196e−009   A10 = 1.49756e−011

Various kinds of data
Zoom ratio 2.91

| | Wide angle | Intermediate | Telephoto |
|---|---|---|---|
| Focal length | 18.54 | 31.42 | 53.94 |
| F-number | 3.60 | 4.16 | 5.88 |
| Half angle of view (degree) | 36.39 | 23.50 | 14.21 |
| Image height | 13.66 | 13.66 | 13.66 |
| Total lens length | 93.93 | 88.40 | 96.64 |
| BF | 19.62 | 29.86 | 48.89 |

Focusing on object at an infinite distance

| d6 | 22.95 | 8.02 | 1.40 |
| d8 | 9.24 | 8.40 | 4.24 |
| d12 | 3.27 | 9.94 | 14.44 |
| d14 | 13.45 | 6.79 | 2.28 |
| d18 | 19.62 | 29.86 | 48.89 |

Focusing on object at distance of 1 m from image plane

| d6 | 23.39 | 8.49 | 1.92 |
| d8 | 8.80 | 7.93 | 3.72 |
| d12 | 3.27 | 9.94 | 14.44 |
| d14 | 13.45 | 6.79 | 2.28 |
| d18 | 19.62 | 29.86 | 48.89 |
| Entrance pupil position | 17.25 | 15.47 | 12.83 |
| Exit pupil position | −24.19 | −21.71 | −19.30 |
| Front side principal point position | 27.95 | 27.74 | 24.10 |
| Rear side principal point position | 1.08 | −1.55 | −5.06 |

-continued

Unit mm

Zoom lens unit data

| Unit | Start Surface | Focal length | Lens configuration length | Front side principal point position | Rear side principal point position |
|---|---|---|---|---|---|
| L1 | 1 | −21.22 | 11.10 | 2.13 | −6.24 |
| L2 | 7 | 47.99 | 2.60 | 0.42 | −1.23 |
| L3 | 9 | 33.17 | 6.20 | 0.63 | −3.93 |
| L4 | 13 | −52.08 | 1.80 | 1.42 | 0.25 |
| L5 | 15 | 90.51 | 3.70 | 0.16 | −2.24 |

Single lens data

| Lens | Start Surface | Focal length |
|---|---|---|
| G1 | 1 | −26.80 |
| G2 | 3 | −36.11 |
| G3 | 5 | 49.57 |
| G4 | 7 | 47.99 |
| G5 | 9 | −42.03 |
| G6 | 10 | 18.43 |
| G7 | 13 | −52.08 |
| G8 | 15 | −1000.00 |
| G9 | 17 | 83.47 |

(Numerical Example 2)

Unit mm

Surface data

| Surface Number | r | d | nd | vd | Effective diameter |
|---|---|---|---|---|---|
| 1 | 36.527 | 1.30 | 1.80000 | 29.8 | 24.02 |
| 2 | 13.443 | 5.86 | | | 19.94 |
| 3 | −79.220 | 1.10 | 1.81600 | 46.6 | 19.59 |
| 4 | 31.267 | 0.10 | | | 19.23 |
| 5 | 23.219 | 2.50 | 1.94595 | 18.0 | 19.47 |
| 6 | 73.830 | (variable) | | | 19.20 |
| 7* | 32.036 | 1.73 | 1.58313 | 59.4 | 12.70 |
| 8 | 620.065 | (variable) | | | 12.85 |
| 9 | 21.620 | 0.80 | 1.84666 | 23.9 | 14.53 |
| 10 | 13.082 | 4.58 | 1.60311 | 60.6 | 14.20 |
| 11 | −41.541 | 1.50 | | | 14.12 |
| 12(stop) | ∞ | (variable) | | | 13.51 |
| 13 | −405.155 | 1.80 | 1.58913 | 61.2 | 9.39 |
| 14* | 32.023 | (variable) | | | 9.76 |
| 15 | −82.084 | 1.20 | 1.58306 | 30.2 | 15.59 |
| 16* | −116.465 | 0.37 | | | 16.19 |
| 17 | 20.131 | 2.63 | 1.48749 | 70.2 | 18.02 |
| 18 | 36.983 | (variable) | | | 18.17 |
| Image plane | ∞ | | | | |

Aspherical surface data

Seventh surface

K = 0.00000e+000   A4 = −1.47179e−005   A6 = −2.29373e−008
A8 = −1.09333e−011

Fourteenth surface

K = 0.00000e+000   A4 = 1.00286e−006   A6 = 6.22186e−008
A8 = −1.60037e−010

Sixteenth surface

K = 0.00000e+000   A4 = 4.18277e−005   A6 = 1.87229e−007
A8 = −1.01269e−009   A10 = 9.38284e−012

-continued

Unit mm

Various kinds of data
Zoom ratio 2.91

| | Wide angle | Intermediate | Telephoto |
|---|---|---|---|
| Focal length | 18.54 | 30.52 | 53.93 |
| F-number | 3.58 | 4.30 | 5.88 |
| Half angle of view (degree) | 36.38 | 24.11 | 14.21 |
| Image height | 13.66 | 13.66 | 13.66 |
| Total lens length | 90.00 | 87.02 | 98.45 |
| BF | 18.99 | 29.45 | 48.90 |
| Focusing on object at an infinite distance | | | |
| d6 | 22.96 | 9.92 | 1.37 |
| d8 | 6.00 | 5.60 | 6.13 |
| d12 | 4.54 | 8.47 | 14.43 |
| d14 | 12.05 | 8.11 | 2.15 |
| d18 | 18.99 | 29.45 | 48.90 |
| Focusing on object at distance of 1 m from image plane | | | |
| d6 | 23.46 | 10.48 | 2.03 |
| d8 | 5.50 | 5.04 | 5.48 |
| d12 | 4.54 | 8.47 | 14.43 |
| d14 | 12.05 | 8.11 | 2.15 |
| d18 | 18.99 | 29.45 | 48.90 |
| Entrance pupil position | 16.81 | 15.03 | 13.55 |
| Exit pupil position | −23.05 | −21.72 | −18.85 |
| Front side principal point position | 27.18 | 27.35 | 24.55 |
| Rear side principal point position | 0.45 | −1.06 | −5.03 |

Zoom lens unit data

| Unit | Start Surface | Focal length | Lens configuration length | Front side principal point position | Rear side principal point position |
|---|---|---|---|---|---|
| L1 | 1 | −21.26 | 10.86 | 2.39 | −5.88 |
| L2 | 7 | 57.87 | 1.73 | −0.06 | −1.15 |
| L3 | 9 | 29.18 | 6.88 | 1.17 | −3.73 |
| L4 | 13 | −50.30 | 1.80 | 1.05 | −0.08 |
| L5 | 15 | 104.69 | 4.20 | −0.67 | −3.48 |

Single lens data

| Lens | Start Surface | Focal length |
|---|---|---|
| G1 | 1 | −27.27 |
| G2 | 3 | −27.35 |
| G3 | 5 | 34.97 |
| G4 | 7 | 57.87 |
| G5 | 9 | −40.88 |
| G6 | 10 | 17.03 |
| G7 | 13 | −50.30 |
| G8 | 15 | −483.10 |
| G9 | 17 | 86.21 |

(Numerical Example 3)

Unit mm

Surface data

| Surface Number | r | d | nd | vd | Effective diameter |
|---|---|---|---|---|---|
| 1 | 63.836 | 1.60 | 1.83481 | 42.7 | 29.69 |
| 2 | 19.975 | 4.21 | | | 25.47 |
| 3 | 76.003 | 1.20 | 1.65844 | 50.9 | 25.15 |
| 4 | 19.850 | 1.44 | | | 23.50 |
| 5 | 20.861 | 3.02 | 2.00272 | 19.3 | 23.85 |
| 6 | 31.417 | (variable) | | | 23.05 |
| 7 | 45.751 | 2.27 | 1.51633 | 64.1 | 13.32 |

-continued

Unit mm

| | | | | | |
|---|---|---|---|---|---|
| 8 | −54.098 | 0.70 | 1.75520 | 27.5 | 12.89 |
| 9 | −58.643 | (variable) | | | 12.72 |
| 10 | 11.418 | 0.95 | 1.84666 | 23.8 | 13.53 |
| 11 | 8.780 | 5.68 | 1.48749 | 70.2 | 12.68 |
| 12 | 1490.785 | 1.00 | | | 11.83 |
| 13(stop) | ∞ | (variable) | | | 11.41 |
| 14* | −75.280 | 1.80 | 1.73077 | 40.5 | 9.04 |
| 15 | 33.791 | (variable) | | | 8.62 |
| 16 | −8.925 | 1.30 | 1.58313 | 59.4 | 11.71 |
| 17* | −12.208 | 0.50 | | | 13.31 |
| 18 | 42.016 | 3.08 | 1.58144 | 40.8 | 16.13 |
| 19 | −57.056 | (variable) | | | 16.75 |
| Image plane | ∞ | | | | |

Aspherical surface data

Fourteenth surface

K = 0.00000e+000    A4 = −7.43107e−006    A6 = 7.37782e−008
A8 = 7.18334e−009

Seventeenth surface

K = 0.00000e+000    A4 = 4.44035e−005    A6 = 2.78931e−007
A8 = 1.27927e−008    A10 = −3.90848e−011

Various kinds of data
Zoom ratio 2.91

| | Wide angle | Intermediate | Telephoto |
|---|---|---|---|
| Focal length | 18.54 | 34.69 | 53.93 |
| F-number | 3.57 | 4.66 | 5.88 |
| Half angle of view (degree) | 36.38 | 21.49 | 14.21 |
| Image height | 13.66 | 13.66 | 13.66 |
| Total lens length | 95.82 | 89.62 | 98.70 |
| BF | 18.50 | 32.68 | 48.62 |
| Focusing on object at an infinite distance | | | |
| d6 | 33.08 | 12.54 | 3.75 |
| d9 | 4.24 | 4.40 | 6.33 |
| d13 | 2.96 | 4.17 | 5.68 |
| d15 | 8.28 | 7.08 | 5.57 |
| d19 | 18.50 | 32.68 | 48.62 |
| Focusing on object at distance of 1 m from image plane | | | |
| d6 | 33.89 | 13.28 | 4.54 |
| d9 | 3.42 | 3.65 | 5.54 |
| d13 | 2.96 | 4.17 | 5.68 |
| d15 | 8.28 | 7.08 | 5.57 |
| d19 | 18.50 | 32.68 | 48.62 |
| Entrance pupil position | 21.24 | 18.28 | 17.16 |
| Exit pupil position | −20.08 | −19.64 | −18.97 |
| Front side principal point position | 30.87 | 29.97 | 28.06 |
| Rear side principal point position | −0.04 | −2.02 | −5.31 |

Zoom lens unit data

| Unit | Start Surface | Focal length | Lens configuration length | Front side principal point position | Rear side principal point position |
|---|---|---|---|---|---|
| L1 | 1 | −27.52 | 11.47 | 2.87 | −5.46 |
| L2 | 7 | 51.10 | 2.97 | 0.91 | −1.00 |
| L3 | 10 | 28.96 | 7.63 | −0.65 | −5.96 |
| L4 | 14 | −31.69 | 1.80 | 0.71 | −0.32 |
| L5 | 16 | 95.24 | 4.89 | 8.50 | 5.89 |

Single lens data

| Lens | Start Surface | Focal length |
|---|---|---|
| G1 | 1 | −35.41 |
| G2 | 3 | −41.15 |
| G3 | 5 | 54.16 |

-continued

Unit mm

| | | |
|---|---|---|
| G4 | 7 | 48.38 |
| G5 | 8 | −989.78 |
| G6 | 10 | −53.74 |
| G7 | 11 | 18.09 |
| G8 | 14 | −31.69 |
| G9 | 16 | −66.64 |
| G10 | 18 | 42.10 |

(Numerical Example 4)

Unit mm

Surface data

| Surface Number | r | d | nd | vd | Effective diameter |
|---|---|---|---|---|---|
| 1 | 35.139 | 1.30 | 1.78590 | 44.2 | 25.65 |
| 2 | 14.063 | 6.84 | | | 21.29 |
| 3 | −48.686 | 1.10 | 1.77250 | 49.6 | 20.89 |
| 4 | 69.198 | 0.25 | | | 20.68 |
| 5 | 28.658 | 2.00 | 1.94595 | 18.0 | 20.84 |
| 6 | 65.207 | (variable) | | | 20.57 |
| 7* | 25.516 | 2.00 | 1.58913 | 61.2 | 12.87 |
| 8 | −575.299 | (variable) | | | 12.87 |
| 9(stop) | ∞ | 0.60 | | | 13.28 |
| 10 | 22.775 | 0.80 | 1.90200 | 25.1 | 13.41 |
| 11 | 11.776 | 3.78 | 1.67790 | 55.3 | 12.97 |
| 12 | −254.428 | (variable) | | | 12.77 |
| 13 | −224.057 | 1.20 | 1.49700 | 81.5 | 9.67 |
| 14 | 27.761 | (variable) | | | 9.91 |
| 15 | 17.315 | 2.63 | 1.69350 | 53.2 | 18.79 |
| 16* | 27.006 | (variable) | | | 18.42 |
| Image plane | ∞ | | | | |

Aspherical surface data

Seventh surface

K = 0.00000e+000    A4 = −6.63507e−006    A6 = −2.20287e−009
A8 = 1.82425e−011

Sixteenth surface

K = 0.00000e+000    A4 = 4.35145e−005    A6 = 2.51847e−008
A8 = −1.96248e−010    A10 = 2.18559e−012

Various kinds of data
Zoom ratio 2.91

| | Wide angle | Intermediate | Telephoto |
|---|---|---|---|
| Focal length | 18.54 | 30.48 | 53.95 |
| F-number | 3.43 | 4.20 | 5.88 |
| Half angle of view (degree) | 36.38 | 24.14 | 14.21 |
| Image height | 13.66 | 13.66 | 13.66 |
| Total lens length | 90.83 | 86.12 | 97.97 |
| BF | 19.47 | 30.15 | 51.51 |
| Focusing on object at an infinite distance | | | |
| d6 | 24.58 | 10.34 | 1.48 |
| d8 | 6.09 | 4.81 | 5.46 |
| d12 | 6.54 | 9.93 | 13.65 |
| d14 | 11.66 | 8.39 | 3.39 |
| d16 | 19.47 | 30.15 | 51.51 |
| Focusing on object at distance of 1 m from image plane | | | |
| d6 | 25.23 | 10.92 | 2.10 |
| d8 | 5.44 | 4.23 | 4.83 |
| d12 | 6.54 | 9.93 | 13.65 |
| d14 | 11.66 | 8.39 | 3.39 |
| d16 | 19.47 | 30.15 | 51.51 |
| Entrance pupil position | 17.37 | 14.44 | 12.11 |
| Exit pupil position | −29.05 | −26.98 | −21.92 |

-continued

Unit mm

| | | | |
|---|---|---|---|
| Front side principal point position | 28.82 | 28.66 | 26.42 |
| Rear side principal point position | 0.93 | −0.33 | −2.44 |

Zoom lens unit data

| Unit | Start Surface | Focal length | Lens configuration length | Front side principal point position | Rear side principal point position |
|---|---|---|---|---|---|
| L1 | 1 | −23.41 | 11.48 | 2.60 | −6.55 |
| L2 | 7 | 41.52 | 2.00 | 0.05 | −1.21 |
| L3 | 9 | 42.76 | 5.18 | 0.56 | −2.73 |
| L4 | 13 | −49.62 | 1.20 | 0.71 | −0.09 |
| L5 | 15 | 62.62 | 2.63 | −2.50 | −3.89 |

Single lens data

| Lens | Start Surface | Focal length |
|---|---|---|
| G1 | 1 | −30.67 |
| G2 | 3 | −36.85 |
| G3 | 5 | 52.65 |
| G4 | 7 | 41.52 |
| G5 | 10 | −28.00 |
| G6 | 11 | 16.70 |
| G7 | 13 | −49.62 |
| G8 | 15 | 62.62 |

(Numerical Example 5)

Unit mm

Surface data

| Surface Number | r | d | nd | vd | Effective diameter |
|---|---|---|---|---|---|
| 1 | 36.644 | 1.30 | 1.78590 | 44.2 | 25.38 |
| 2 | 14.520 | 6.52 | | | 21.25 |
| 3 | −61.168 | 1.10 | 1.77250 | 49.6 | 20.74 |
| 4 | 48.244 | 0.25 | | | 20.36 |
| 5 | 26.532 | 2.09 | 1.94595 | 18.0 | 20.50 |
| 6 | 56.907 | (variable) | | | 20.18 |
| 7* | 30.119 | 1.77 | 1.58313 | 59.4 | 12.40 |
| 8 | −387.552 | (variable) | | | 12.52 |
| 9 | 25.521 | 0.80 | 1.84666 | 23.9 | 13.42 |
| 10 | 12.932 | 3.63 | 1.69680 | 55.5 | 13.13 |
| 11 | −102.805 | 2.00 | | | 12.98 |
| 12(stop) | ∞ | (variable) | | | 12.46 |
| 13 | 230.938 | 1.80 | 1.55332 | 71.7 | 9.14 |
| 14* | 25.036 | (variable) | | | 9.63 |
| 15 | 105.356 | 1.20 | 1.58306 | 30.2 | 16.08 |
| 16* | 65.266 | 0.91 | | | 16.59 |
| 17 | 20.759 | 2.89 | 1.63930 | 44.9 | 18.66 |
| 18 | 44.624 | (variable) | | | 18.74 |
| Image plane | ∞ | | | | |

Aspherical surface data

Seventh surface

K = 0.00000e+000    A4 = −1.03462e−005    A6 = −9.15278e−009
A8 = 5.32403e−011

Fourteenth surface

K = 0.00000e+000    A4 = −1.84903e−005    A6 = 5.43932e−007
A8 = −7.69363e−009

Sixteenth surface

K = 0.00000e+000    A4 = 5.18742e−005    A6 = −5.01621e−008
A8 = 1.91723e−009    A10 = −6.36803e−012

Unit mm

Various kinds of data
Zoom ratio 2.91

| | Wide angle | Intermediate | Telephoto |
|---|---|---|---|
| Focal length | 18.53 | 31.27 | 53.93 |
| F-number | 3.51 | 4.30 | 5.88 |
| Half angle of view (degree) | 36.40 | 23.60 | 14.21 |
| Image height | 13.66 | 13.66 | 13.66 |
| Total lens length | 90.01 | 85.39 | 96.20 |
| BF | 18.50 | 28.71 | 47.68 |

Focusing on object at an infinite distance

| d6 | 24.20 | 9.36 | 1.20 |
| d8 | 5.46 | 5.46 | 5.46 |
| d12 | 4.39 | 9.23 | 13.85 |
| d14 | 11.21 | 6.37 | 1.75 |
| d18 | 18.50 | 28.71 | 47.68 |

Focusing on object at distance of 1 m from image plane

| d6 | 24.77 | 9.95 | 1.86 |
| d8 | 4.89 | 4.87 | 4.80 |
| d12 | 4.39 | 9.23 | 13.85 |
| d14 | 11.21 | 6.37 | 1.75 |
| d18 | 18.50 | 28.71 | 47.68 |
| Entrance pupil position | 18.13 | 16.00 | 14.24 |
| Exit pupil position | −24.02 | −22.04 | −19.49 |
| Front side principal point position | 28.59 | 28.01 | 24.88 |
| Rear side principal point position | −0.03 | −2.56 | −6.25 |

Zoom lens unit data

| Unit | Start Surface | Focal length | Lens configuration length | Front side principal point position | Rear side principal point position |
|---|---|---|---|---|---|
| L1 | 1 | −23.10 | 11.25 | 2.79 | −6.03 |
| L2 | 7 | 48.00 | 1.77 | 0.08 | −1.04 |
| L3 | 9 | 35.56 | 6.43 | 0.44 | −4.17 |
| L4 | 13 | −50.91 | 1.80 | 1.30 | 0.14 |
| L5 | 15 | 72.57 | 4.99 | −0.24 | −3.58 |

Single lens data

| Lens | Start Surface | Focal length |
|---|---|---|
| G1 | 1 | −31.41 |
| G2 | 3 | −34.76 |
| G3 | 5 | 50.85 |
| G4 | 7 | 48.00 |
| G5 | 9 | −31.89 |
| G6 | 10 | 16.70 |
| G7 | 13 | −50.91 |
| G8 | 15 | −297.45 |
| G9 | 17 | 57.98 |

TABLE 1

| CONDITIONAL EXPRESSION | LOWER LIMIT | UPPER LIMIT | EMBODIMENTS | | | | |
|---|---|---|---|---|---|---|---|
| | | | 1 | 2 | 3 | 4 | 5 |
| (1) | −0.60 | −0.01 | −0.121 | −0.175 | −0.302 | −0.028 | −0.065 |
| (2) | 0.10 | 1.00 | 0.301 | 0.288 | 0.701 | 0.329 | 0.365 |
| (3) | 0.90 | 1.70 | 1.145 | 1.147 | 1.484 | 1.262 | 1.247 |
| (4) | 0.90 | 1.50 | 1.226 | 1.157 | 1.058 | 1.253 | 1.202 |
| (5) | 1.40 | 3.50 | 2.810 | 2.713 | 1.709 | 2.676 | 2.747 |
| (6) | 2.50 | 7.00 | 4.883 | 5.647 | 5.137 | 3.378 | 3.916 |
| (7) | −6.50 | −3.00 | −5.479 | −4.773 | −3.574 | −5.003 | −4.718 |
| (8) | 1.40 | 3.20 | 2.112 | 2.698 | 2.606 | 1.787 | 2.154 |
| (9) | −2.00 | −0.40 | −0.614 | −1.057 | −1.599 | −1.119 | −1.015 |

Next, referring to FIG. 11, an example of a still camera using the zoom lens of each of the present embodiments as an image pickup optical system will be described. In FIG. 11, reference numeral 10 denotes a still camera body, and reference numeral 11 denotes an image pickup optical system that is configured by any one of the zoom lenses in the embodiments, and reference numeral 12 denotes a photoelectric conversion element (a solid-state image pickup element) that receives light of an image formed by the zoom lens. Applying the zoom lens of each embodiment to an image pickup apparatus such as a still camera, an image pickup apparatus with high optical performance can be achieved.

When an image pickup element such as a CCD is used as the solid-state image pickup element, various kinds of aberrations such as distortion or chromatic aberration can be electronically corrected, and therefore a high-quality output image is easily obtained. The zoom lens of each embodiment can also be applied to a lens shutter camera or a single-lens reflex camera that does not have a quick return mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-099789, filed on Apr. 25, 2012, which is hereby incorporated by reference herein in its entirety.

What is claimed is:

1. A zoom lens comprising:
   a first lens unit having a negative refractive power, a second lens unit having a positive refractive power, a third lens unit having a positive refractive power, a fourth lens unit having a negative refractive power, and a fifth lens unit having a positive refractive power, in an order from an object side to an image side; and
   an aperture stop disposed between a lens surface closest to the image side of the second lens unit and a lens surface closest to the object side of the fourth lens unit,
   wherein an interval of each lens unit is configured to be changed in zooming,
   wherein the first lens unit, in order from the object side to the image side, consists of one or two negative lenses and one positive lens,
   wherein the second lens unit consists of one lens component that moves to the image side in focusing on an object at an infinite distance to a short distance object, and
   wherein following conditional expressions are satisfied:

$-0.60 < f23w/f4Rw < -0.01$ $0.1 < D2/D23w < 1.0$ where D23w is an interval between the second lens unit and the third lens unit when focusing on the object at an infinite distance at a wide angle end, f23w is a combined focal length of the second lens unit and the third lens unit when focusing on the object at an infinite distance at the wide angle end, f4Rw is a combined focal length of each lens unit at the image side relative to the third lens unit when focusing on the object at an infinite distance at the wide angle end, and D2 is a length on an optical axis from a lens surface closest to the object side of the second lens unit to the lens surface closest to the image side of the second lens unit.

2. The zoom lens according to claim 1, wherein following conditional expression is satisfied:

$0.9 < |f1|/fw < 1.7$ where fw is a focal length of a total system when focusing on the object at an infinite distance at the wide angle end, and f1 is a focal length of the first lens unit.

3. The zoom lens according to claim 1, wherein following conditional expression is satisfied:

$0.9 < f23w/fw < 1.5$ where fw is a focal length of a total system when focusing on the object at an infinite distance at the wide angle end.

4. The zoom lens according to claim 1, wherein following conditional expression is satisfied:

$1.4 < |f4|/fw < 3.5$ where fw is a focal length of a total system when focusing on the object at an infinite distance at the wide angle end, and f4 is a focal length of the fourth lens unit.

5. The zoom lens according to claim 1, wherein following conditional expression is satisfied:

$2.5 < f5/fw < 7.0$ where fw is a focal length of a total system when focusing on the object at an infinite distance at the wide angle end, and f5 is a focal length of the fifth lens unit.

6. The zoom lens according to claim 1, wherein following conditional expression is satisfied:

$-6.5 < (1-\beta 2t^2)*\beta Rt^2 < -3.0$ where $\beta 2t$ is a lateral magnification of the second lens unit when focusing on the object at an infinite distance at a telephoto end, and $\beta Rt$ is a lateral magnification of a total of lens units which are located at the image side relative to the second lens unit when focusing on the object at an infinite distance at the telephoto end.

7. The zoom lens according to claim 1, wherein a following conditional expression is satisfied:

$1.4 < f2/f23w < 3.2$ where f2 is a focal length of the second lens unit.

8. The zoom lens according to claim 1,
wherein the fourth lens unit consists of one lens component.

9. The zoom lens according to claim 1,
wherein the fourth lens unit is moved in a direction having a component of a direction perpendicular to the optical axis so as to move an imaging position in the direction perpendicular to the optical axis.

10. The zoom lens according to claim 1,
wherein following conditional expression is satisfied:

$$-2.0<(1-\beta 4w)*\beta Rw<-0.4$$

where β4w is a lateral magnification of the fourth lens unit when focusing on the object at an infinite distance at the wide angle end, and βRw is a lateral magnification of a total of lens units which are located at the image side relative to the fourth lens unit when focusing on the object at an infinite distance at the wide angle end.

11. The zoom lens according to claim 1,
wherein the third lens unit and the fifth lens unit move along the same locus in zooming.

12. An image pickup apparatus comprising:
a zoom lens; and
a photoelectric conversion element configured to receive an image formed by the zoom lens,
wherein the zoom lens comprises a first lens unit having a negative refractive power, a second lens unit having a positive refractive power, a third lens unit having a positive refractive power, a fourth lens unit having a negative refractive power, and a fifth lens unit having a positive refractive power, in an order from an object side to an image side; and
an aperture stop disposed between a lens surface closest to the image side of the second lens unit and a lens surface closest to the object side of the fourth lens unit,
wherein an interval of each lens unit is configured to be changed in zooming,
wherein the first lens unit, in order from the object side to the image side, consists of one or two negative lenses and one positive lens,
wherein the second lens unit consists of one lens component that moves to the image side in focusing on an object at an infinite distance to a short distance object, and
wherein following conditional expressions are satisfied:

$$-0.60<f23w/f4Rw<-0.01$$

$$0.1<D2/D23w<1.0$$

where D23w is an interval between the second lens unit and the third lens unit when focusing on the object at an infinite distance at a wide angle end, f23w is a combined focal length of the second lens unit and the third lens unit when focusing on the object at an infinite distance at the wide angle end, f4Rw is a combined focal length of each lens unit at the image side relative to the third lens unit when focusing on the object at an infinite distance at the wide angle end, and D2 is a length on an optical axis from a lens surface closest to the object side of the second lens unit to the lens surface closest to the image side of the second lens unit.

* * * * *